(12) United States Patent
Hamada

(10) Patent No.: US 8,614,762 B2
(45) Date of Patent: Dec. 24, 2013

(54) AUTO-FOCUSING APPARATUS

(75) Inventor: Masataka Hamada, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 13/267,157

(22) Filed: Oct. 6, 2011

(65) Prior Publication Data

US 2012/0182462 A1 Jul. 19, 2012

(30) Foreign Application Priority Data

Jan. 19, 2011 (KR) .................. 10-2011-0005376

(51) Int. Cl.
*H04N 5/232* (2006.01)
*H04N 5/235* (2006.01)
*G03B 17/00* (2006.01)
*G03B 3/10* (2006.01)
*G06K 9/40* (2006.01)

(52) U.S. Cl.
USPC ........ 348/345; 348/346; 348/347; 348/221.1; 348/208.12; 396/82; 396/131; 396/93; 382/255

(58) Field of Classification Search
USPC .............. 348/345, 347, 346, 221.1, 362, 326, 348/229.1, 208.12, E5.035; 396/82, 87, 91, 396/93, 131, 102, 103; 382/255
See application file for complete search history.

(56) References Cited

U.S. PATENT DOCUMENTS

| 5,005,039 | A | 4/1991 | Hamada et al. | |
|---|---|---|---|---|
| 5,196,881 | A | 3/1993 | Hamada et al. | |
| 5,434,638 | A | 7/1995 | Ishibashi et al. | |
| 2004/0109081 | A1* | 6/2004 | Sumi | 348/345 |
| 2005/0012846 | A1* | 1/2005 | Shinohara | 348/345 |

FOREIGN PATENT DOCUMENTS

| JP | 2006-011068 A | 1/2006 |
|---|---|---|
| JP | 2007-303222 A | 11/2007 |
| JP | 2009-012174 A | 1/2009 |
| JP | 2010-107711 A | 5/2010 |

\* cited by examiner

*Primary Examiner* — Nhan T Tran
*Assistant Examiner* — Marly Camargo
(74) *Attorney, Agent, or Firm* — Drinker Biddle & Reath LLP

(57) ABSTRACT

An auto-focusing apparatus controls backlash compensation driving of a focus lens during exposure preparation when focusing is performed by moving the focus lens to a target position of the focus lens. A shutter release time lag can be reduced, and in particular, the auto-focusing apparatus can be usefully applied to the case where a moving subject is photographed.

19 Claims, 19 Drawing Sheets

AUTO-FOCUSING APPARATUS

CROSS-REFERENCE TO RELATED PATENT APPLICATIONS

This application claims the priority benefit of Korean Patent Application No. 10-2011-0005376, filed on Jan. 19, 2011, in the Korean Intellectual Property Office, the disclosure of which is incorporated herein in its entirety by reference.

BACKGROUND

1. Field

Embodiments relate to an auto-focusing apparatus.

2. Description of the Related Art

There are related-art methods of previously obtaining a target position of a focus lens by using a phase difference Automatic Focusing (AF) module and of performing lens driving during a release time lag so as to focus on a subject (moving object) that moves in a direction of an optical axis of a camera (U.S. Pat. No. 5,005,039, U.S. Pat. No. 5,196,881, and U.S. Pat. No. 5,434,638). Focusing can also be performed by using the methods even when a moving subject (moving object) is photographed.

In contrast AF type cameras using an imaging device, a peak of focus evaluation values is detected, and a target position of a focus lens corresponding to the peak is detected. Thus, the target position cannot be previously predicted. In contrast AF type cameras using an image device, the target position of the focus lens cannot be previously obtained, and it takes time to detect the peak of the focus evaluation values. Thus, it is not easy to focus on the moving object. JP 2009-012174 discloses a method of predicting a target position of a focus lens with respect to a moving object by using focus evaluation values even in contrast AF type cameras. However, the method disclosed in JP 2009-012174 does not consider backlash compensation driving. Thus, focusing is not substantially performed, and there is no reality. In addition, functions of shutter or diaphragm control are not considered with respect to the moving object during a release time lag, and there is no function of compensating for the release time lag of a camera.

SUMMARY

Embodiments include an auto-focusing apparatus that may focus on a moving object substantially.

According to an embodiment, an auto-focusing apparatus includes: a focus lens; a driving unit that drives the focus lens; an imaging device that receives an optical signal that has passed through the focus lens and generates an image signal; a focus evaluation value obtaining unit that obtains focus evaluation values related to a focusing state from the image signal; a target position obtaining unit that obtains a target position of the focus lens corresponding to a peak of the focus evaluation values; a compensation driving controller that controls backlash compensation driving of the focus lens when the focus lens is moved to the target position of the focus lens; and an exposure controller that performs imaging by using the imaging device after an exposure preparation control operation is performed, wherein the compensation driving controller controls backlash compensation driving of the focus lens during the exposure preparation.

The exposure preparation control operation may include at least one of a shutter preparation control operation and a diaphragm control operation.

The exposure controller may perform the exposure preparation control operation after the target position of the focus lens corresponding to a peak of the focus evaluation values is obtained by the target position obtaining unit.

The compensation driving controller may control the focus lens to perform backlash compensation driving by driving the focus lens in the same direction as a direction toward the target position of the focus lens.

The compensation driving controller may control the focus lens to perform backlash compensation driving by driving the focus lens in a second direction different from a first direction toward the target position of the focus lens.

The compensation driving controller may control the focus lens to perform backlash compensation driving by driving the focus lens in a first direction during the exposure preparation.

The compensation driving controller may control the focus lens to perform backlash compensation driving by driving the focus lens in a first direction and in a second direction during the exposure preparation.

The auto-focusing apparatus may further include a moving object determining unit, wherein if it is determined that a difference between the focus evaluation values is greater than a reference value and a moving object has changed, the moving object determining unit determines that the image signal is generated by photographing the moving object.

The backlash compensation driving may include compensation driving of an amount of a focus deviation generated due to movement of the moving object when the moving object is photographed during the exposure preparation.

The amount of a focus deviation generated due to movement of the moving object when the moving object is photographed during the exposure preparation may correspond to an amount of correction from a speed of the moving object and a release time lag time that is obtained before the exposure preparation starts, and the backlash compensation driving may include additional compensation driving of the focus lens by the amount of correction.

According to another embodiment, an auto-focusing apparatus includes: a focus lens; a driving unit that drives the focus lens; an imaging device that receives an optical signal that has passed through the focus lens and generates an image signal; a focus evaluation value obtaining unit that obtains focus evaluation values related to a focusing state from the image signal; a target position obtaining unit that obtains a target position of the focus lens corresponding to a peak of the focus evaluation values; a driving controller that finally driving the focus lens to the target position for an in-focus operation; and an exposure controller that performs imaging by using the imaging device after an exposure preparation control operation is performed, wherein the driving controller controls the focus lens to perform the final compensation driving during the exposure preparation.

The final compensation driving of the focus lens to the target position may include driving of the focus lens that does not obtain the focus evaluation values.

The final compensation driving of the focus lens to the target position may be performed in the same direction as a driving direction of the focus lens that obtains the target position.

The auto-focusing apparatus may further include a moving object determining unit, wherein if it is determined that a difference between the focus evaluation values is greater than a reference value and a moving object has changed, the moving object determining unit determines that the image signal is generated by photographing the moving object.

The final driving of the focus lens to the target position may include compensation driving of an amount of a focus deviation generated due to movement of the moving object when the moving object is photographed during the exposure preparation.

The amount of a focus deviation generated due to movement of the moving object when the moving object is photographed during the exposure preparation may correspond to an amount of correction from a speed of the moving object and a release time lag time that is obtained before the exposure preparation starts, and compensation driving of the amount of the focus deviation may be corrected when the focus lens is finally driven to the target position.

BRIEF DESCRIPTION OF THE DRAWINGS

The above and other features and advantages will become more apparent by describing in detail exemplary embodiments with reference to the attached drawings in which.

DETAILED DESCRIPTION

Embodiments will now be described more fully with reference to the accompanying drawings, in which exemplary embodiments are shown.

{Configuration and Operation of Digital Photographing Device}

Figure 1:
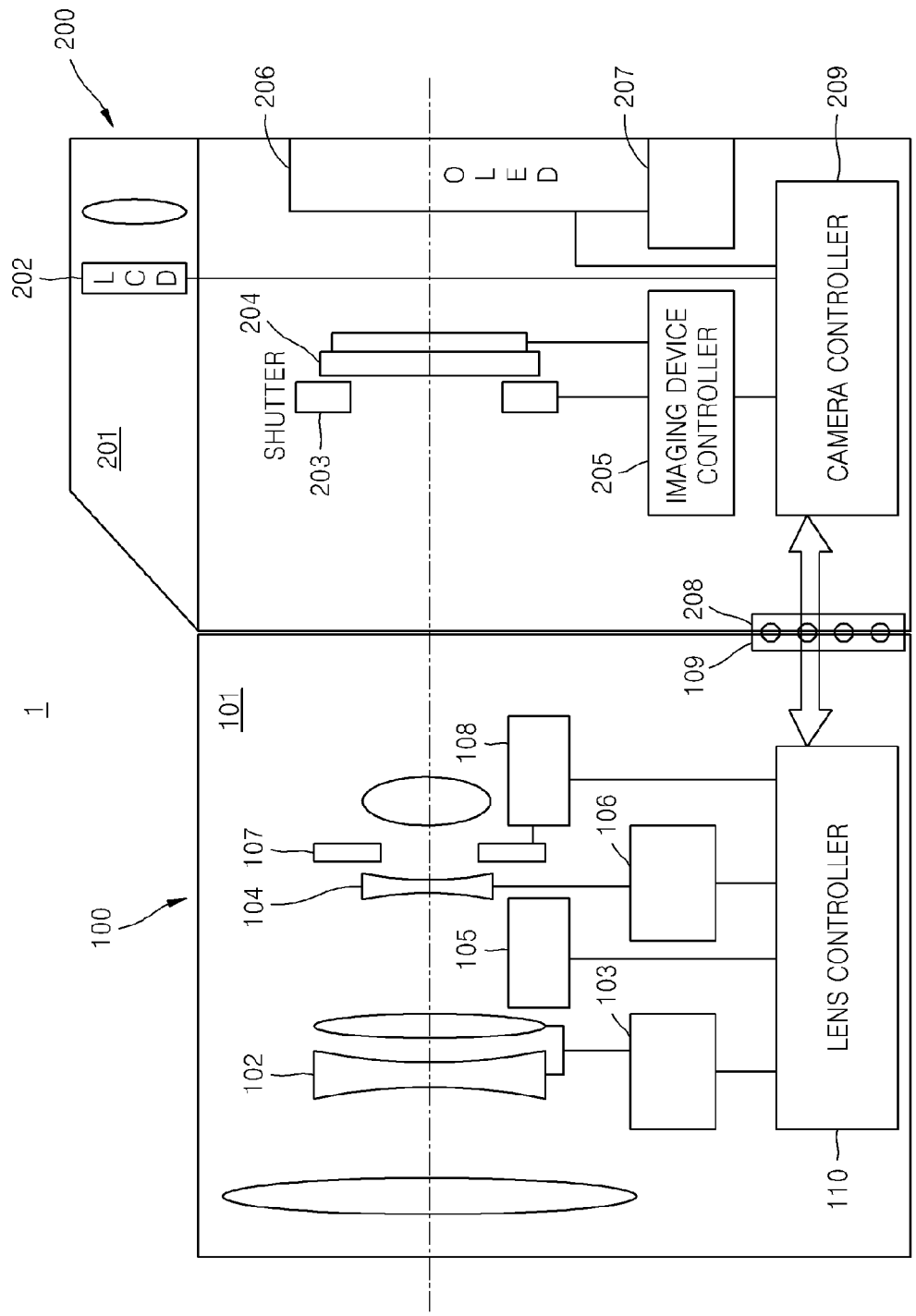
FIG. 1 illustrates a digital photographing device of an auto-focusing apparatus, according to an embodiment.

FIG. 1 illustrates a digital photographing device 1 of an auto-focusing apparatus, according to an embodiment.

Referring to FIG. 1, the digital photographing device 1 according to the current embodiment includes an exchangeable lens 100 and a main body unit 200. The exchangeable lens 100 has a focus-detecting function, and the main body unit 200 has a function of controlling the exchangeable lens 100 to drive a focus lens 104.

The exchangeable lens 100 (hereinafter referred to as a 'lens') includes an imaging optical system 101, a zoom lens position detecting sensor 103, a lens driving unit 105, a focus lens position detecting sensor 106, a diaphragm driving unit 108, a lens controller 110, and a lens mount 109.

The imaging optical system 101 includes a zoom lens 102 for controlling zoom magnification, the focus lens 104 for changing a focus position, and a diaphragm 107. The zoom lens 102 and the focus lens 104 may each include a lens group consisting of a plurality of lenses.

The zoom lens position detecting sensor 103 and the focus lens position detecting sensor 106 respectively detect the position of the zoom lens 102 and the position of the focus lens 104. The time at which the position of the focus lens 104 is detected may be set by using the lens controller 110 or a camera controller 209 as described below. For example, the time at which the position of the focus lens 104 is detected may be the time at which a focus is detected from an image signal.

The lens driving unit 105 and the diaphragm driving unit 108 are controlled by the lens controller 110 and drive the focus lens 104 and the diaphragm 107, respectively. In particular, the lens driving unit 105 drives the focus lens 104 in a direction of an optical axis.

The lens controller 110 transmits the information regarding the detected position of the focus lens 104 to the main body unit 200. In this regard, when there is a change in the position of the focus lens 104 or when there is a request for the position information of the focus lens 104 from the camera controller 209, the lens controller 110 may transmit the information regarding the detected position of the focus lens 104 to the main body unit 200.

The lens mount 109 includes lens-side communication pins that are engaged with camera-side communication pins as described below. The lens mount 109 is used as a transmission path for data, a control signal, or the like. Next, a description of the configuration of the main body unit 200 is provided.

The main body unit 200 may include a viewfinder 201, a shutter 203, an imaging device 204, an imaging device controller 205, a display unit 206, a manipulation unit 207, the camera controller 209, and a camera mount 208.

The viewfinder 201 includes a liquid crystal display unit 202. The viewfinder 201 may check an image captured in real-time.

The shutter 203 determines the time at which light is irradiated onto the imaging device 204, i.e., an exposure time.

The imaging device 204 receives an optical signal that has transmitted through the imaging optical system 101 of the lens 100, thereby generating an image signal. The imaging device 204 may include a plurality of photoelectric converters arranged in the form of a matrix, and a horizontal transmission path on which charges are moved from the plurality of photoelectric converters and the image signal is read, or the like.

The imaging device controller 205 generates a timing signal and controls the imaging device 204 to capture an image in synchronization with the timing signal. Also, the imaging device controller 205 reads the image signal if charge accumulation on each scan line is completed. The read image signal is used to detect a focus by using the camera controller 209.

Various types of images and information are displayed on the display unit 206. The display unit 206 may be an organic light-emitting diode (OLED) display apparatus, a liquid crystal display (LCD) apparatus, or the like.

The manipulation unit 207 inputs various types of commands from a user to manipulate the digital photographing device 1. The manipulation unit 207 may include various types of buttons such as a shutter release button, a main switch (SM), a mode dial, a menu button, and the like.

The camera controller 209 detects the focus of the image signal generated by the imaging device 204 so as to obtain focus evaluation values. Also, the camera controller 209 obtains and stores the focus evaluation values every time when the focus of the image signal is detected according to the timing signal generated by the imaging device controller 205 and calculates a target position of the focus lens 104 from the focus lens position information transmitted from the lens 100 and the stored focus evaluation values. The result of the calculated target position of the focus lens 104 is transmitted to the lens 100.

The camera mount 208 includes camera-side communication pins.

Hereinafter, operations of the lens 100 and the main body unit 200 will be described.

When a subject is photographed, a main switch SM of the manipulation unit 207 is manipulated to start operation of the digital photographing device 1. The digital photographing device 1 displays a live view as follows.

The optical signal of the subject that has transmitted through the imaging optical system 101 is incident on the imaging device 204. In this case, the shutter 203 is in an open state. The optical signal from the subject is converted into an electrical signal by the imaging device 204, and an image signal is generated from the electrical signal. The imaging device 204 operates in response to the timing signal generated by the imaging device controller 205. The image signal from the subject is transformed to displayable data by the camera controller 209 and is output to the viewfinder 201 and the display unit 206. The operation is a live view display, and a live view image displayed by a live view is continuously displayed as a moving image.

After the live view image is displayed, if the shutter release button of the manipulation unit 207 is half-pressed, the digital photographing device 1 starts an Automatic Focusing (AF) operation. The AF operation is performed using the image signal generated by the imaging device 204. The target position of the focus lens 104 is calculated from the focus evaluation values related to contrast values by using a contrast AF method, and the lens 100 is driven based on the result of the calculation. The focus evaluation values are calculated by the camera controller 209. The camera controller 209 calculates information about controlling of the focus lens 104 from the focus evaluation values and transmits the information via the communication pins included in the lens mount 109 and the communication pins included in the camera mount 208 to the lens controller 110.

The lens controller 110 controls the lens driving unit 105 based on the received information and drives the focus lens 104 in the direction of the optical axis, thereby performing the AF operation. The position of the focus lens 104 is monitored by the focus lens position detecting sensor 106 and is fed back to the camera controller 209.

When the zoom lens 102 is manipulated and zoomed by the user, the position of the zoom lens 102 is detected by the zoom lens position detecting sensor 103, and the lens controller 110 changes AF control parameters of the focus lens 104 so as to perform the AF operation again.

When an image obtained from the subject is in an in-focus state by performing the operation described above, the digital photographing device 1 performs an exposure operation by fully pressing the shutter release button (S2). In this regard, the camera controller 209 first closes the shutter 203 fully and transmits light measurement information obtained from the lens controller 110 as diaphragm control information to the camera controller 209. The lens controller 110 controls the diaphragm driving unit 108 based on the diaphragm control information, and the diaphragm driving unit 108 drives the diaphragm 107 to have a properly-tightened value. The camera controller 209 controls the shutter 203 based on the light measurement information, opens the shutter 203 at a proper exposure time so that a photographing operation is performed and the image of the subject is captured.

Figure 3:
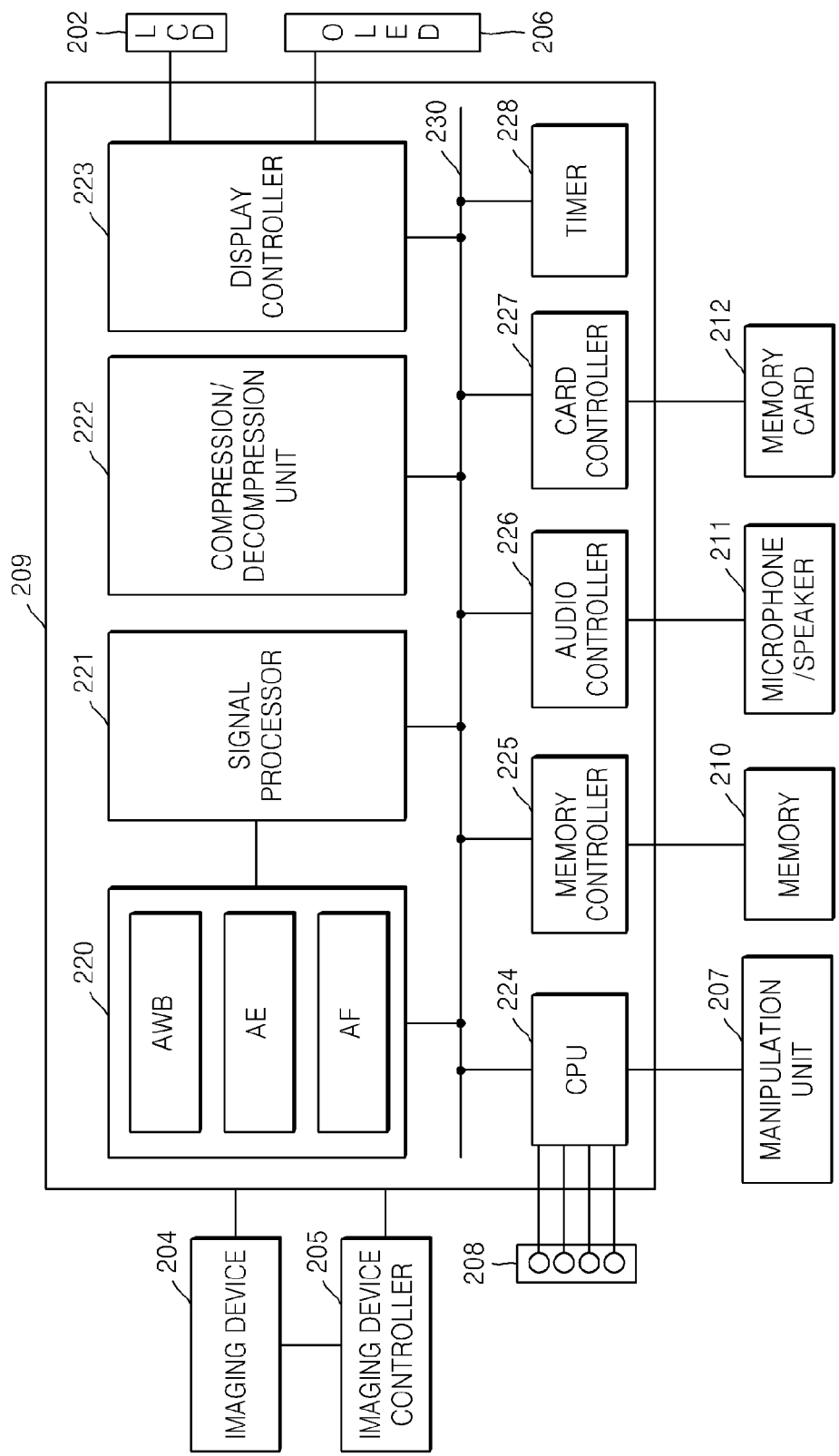
FIG. 3 illustrates a block diagram of a camera controller of the digital photographing device illustrated in FIG. 1, according to an embodiment.

Image signal processing and compression are performed on the captured image, and the captured image is stored in a memory card 212 (see FIG. 3). The captured image is output to the viewfinder 201 and the display unit 206 that display the subject. The image is referred to as a quick view image.

A series of photographing operations are completed by the above-described process.

Figure 2:
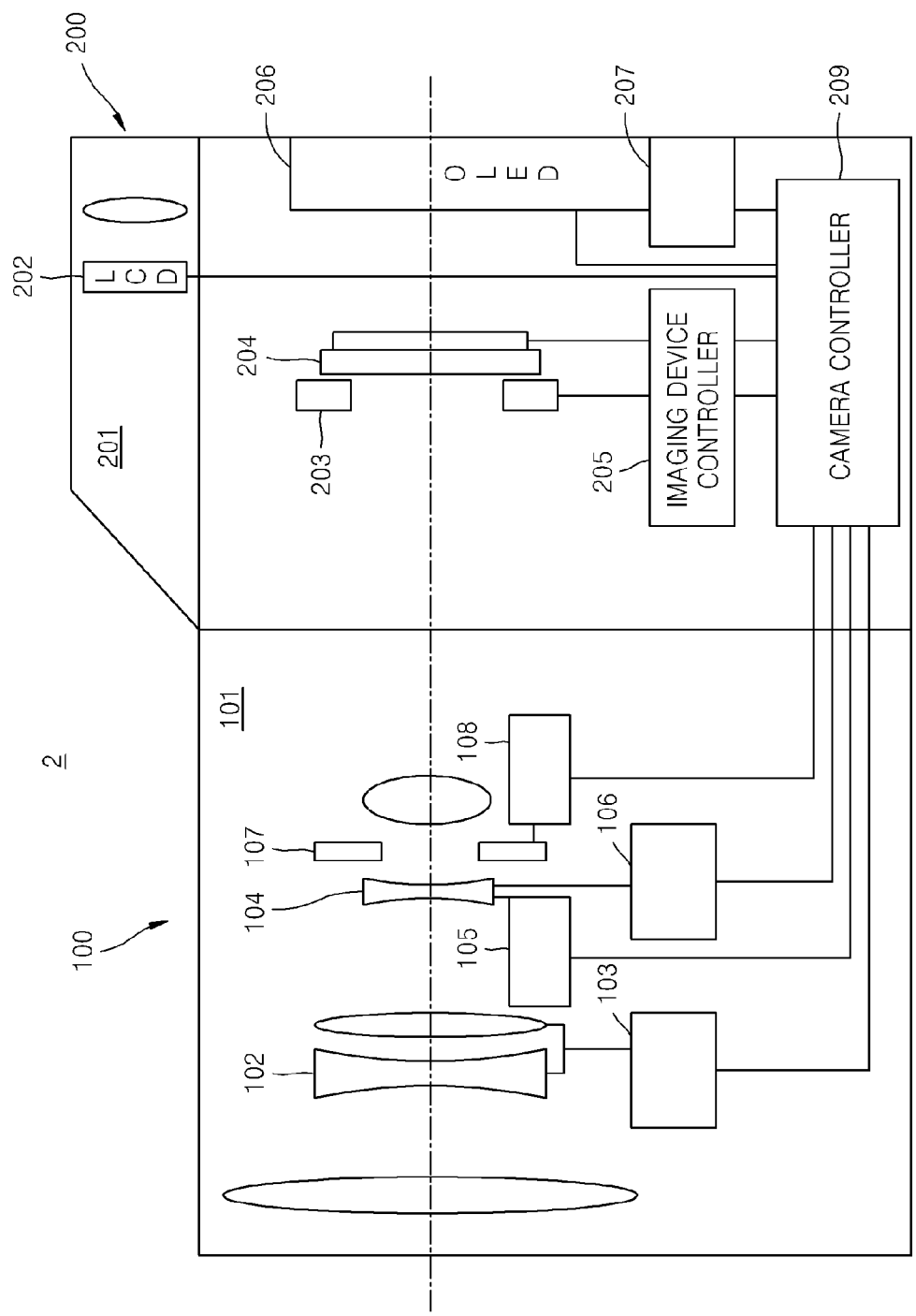
FIG. 2 illustrates a digital photographing device of an auto-focusing apparatus, according to another embodiment.

FIG. 2 illustrates a digital photographing device 2 of an auto-focusing apparatus, according to another embodiment.

Referring to FIG. 2, the digital photographing device 2 according to the current embodiment has similar configuration and function to those of the digital photographing device 1 illustrated in FIG. 1, and thus, differences between them will be described. In the digital photographing device 2, the lens 100 and the main body unit 200 are integrally formed. Thus, the lens 100 cannot be exchanged with another one. Also, since the lens 100 and the main body unit 200 are integrally formed, there are no lens mount 109 and no camera mount 208. Thus, the camera controller 209 directly controls the lens driving unit 105, the diaphragm driving unit 108, or the like. Also, the camera controller 209 may receive position information from the zoom lens position detecting sensor 103 and the focus lens position detecting sensor 106.

{Control Circuit and Camera Operation}

FIG. 3 illustrates a block diagram of the camera controller 209 of the digital photographing device 1 illustrated in FIG. 1, according to an embodiment.

Referring to FIG. 3, the camera controller 209 according to the current embodiment may include a pre-processor 220, a signal processor 221, a compression/decompression unit 222, a display controller 223, a central processing unit (CPU) 224, a memory controller 225, an audio controller 226, a card controller 227, a timer 228, a main bus 230, and the like.

The camera controller 209 transmits various types of instructions and data to each of the above-described elements of the digital photographing device 1 via the main bus 230.

The pre-processor 220 receives an image signal generated by the imaging device 204 and performs an operation for obtaining evaluation values so as to perform Automatic White Balance (AWB), Automatic Exposure (AE), and AF. In detail, the pre-processor 220 includes a focus evaluation value obtaining unit AF for obtaining focus evaluation values related to a focusing state from the image signal generated by the imaging device 204. The pre-processor 220 further includes a white balance evaluation value obtaining unit AWB for obtaining evaluation values for white balance control, and an exposure evaluation value obtaining unit AE for obtaining evaluation values for exposure control.

The signal processor 221 performs a series of image processing such as gamma correction and the like, thereby generating a live view image or a captured image displayable on the display unit 206.

The compression/decompression unit 222 compresses the image signal in the form of JPEG or H.264 compression. An image file including image data generated by the compression is transmitted to the memory card 212 and is stored therein.

The display controller 223 controls image output on a display screen such as the LCD unit 202 or the display unit 206 of the viewfinder 201.

The CPU 224 controls all operations of the camera controller 209. Also, in the digital photographing device 1 of FIG. 1, the CPU 224 performs communication with the lens controller 110. In the present embodiment, the CPU 224 includes a target position obtaining unit for obtaining a target position of the focus lens 104 corresponding to a peak of the focus evaluation values obtained by the focus evaluation value obtaining unit AF. Also, when the focus lens 104 is moved to its target position, the CPU 224 includes a compensation driving controller that controls backlash compensation driving of the focus lens 104. According to another embodiment, the CPU 224 may include a driving controller for finally driving the focus lens 104 to the target position for an in-focus operation, instead of the compensation driving controller. The compensation driving controller and the driving controller may control compensation driving by using a method to be described below with reference to FIGS. 4 through 12. In detail, the compensation driving controller and the driving controller will be described with reference to the following attached drawings. The CPU 224 further includes an exposure controller for performing an exposure preparation control operation and imaging by using the imaging device 204 after the exposure preparation control operation is performed. The exposure preparation control operation may include at least one of a shutter preparation control operation and a diaphragm control operation. The exposure controller may control the shutter 203 and/or the diaphragm 107 so that the imaging device 204 captures an image, thereby controlling exposure.

Also, the CPU 224 may further include a moving object determining unit that, if a difference between the focus evaluation values is greater than a reference value, determines that the subject moved, i.e., that the subject is a moving object.

The memory controller 225 controls a memory unit 210 for temporarily storing the captured image or data such as associative information. The audio controller 226 controls a microphone/speaker 211. Also, the card controller 227 controls a memory card 212 for storing the captured image. The timer 228 measures time.

FIGS. 4 through 7 illustrate graphs for explaining a contrast AF operation.

Focus evaluation values are obtained from an image signal. The focus evaluation values according to the position of a focus lens are sequentially obtained, thereby obtaining a target position of the focus lens corresponding to a peak of the focus evaluation values. The focus evaluation values are information about contrast of the image signal at which the subject is photographed, and the target position of the focus lens corresponding to the peak of the focus evaluation values may be determined as the position of the focus lens in an in-focus state.

FIGS. 4, 5, 6, and 7 illustrate graphs for explaining an operation of driving the focus lens to a target position of the focus lens using a contrast Automatic Focusing (AF) operation, according to an embodiment.

Figure 4:
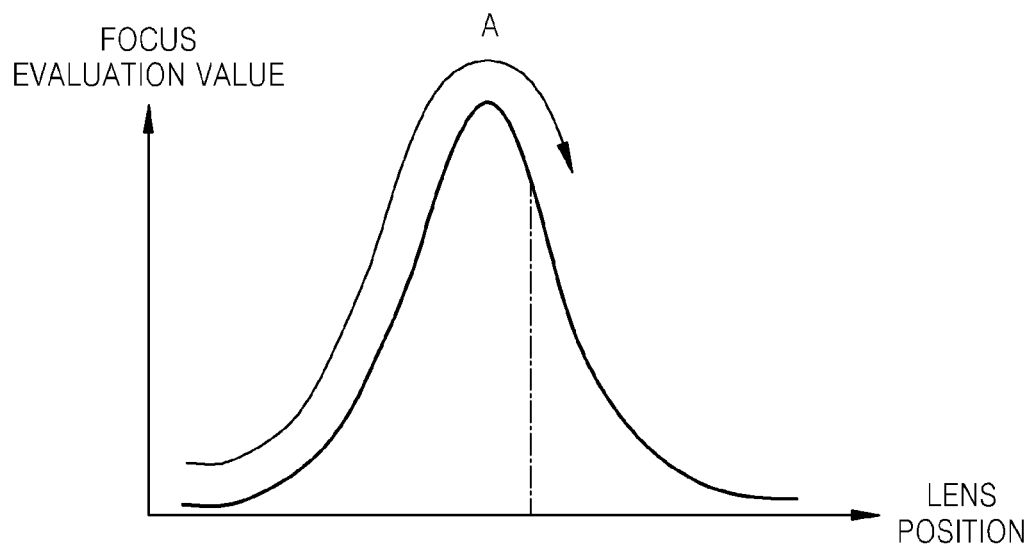
FIGS. 4, 5, 6, and 7 illustrate graphs for explaining an operation of driving the focus lens to a target position of the focus lens using a contrast Automatic Focusing (AF) operation, according to an embodiment.
Figure 5:
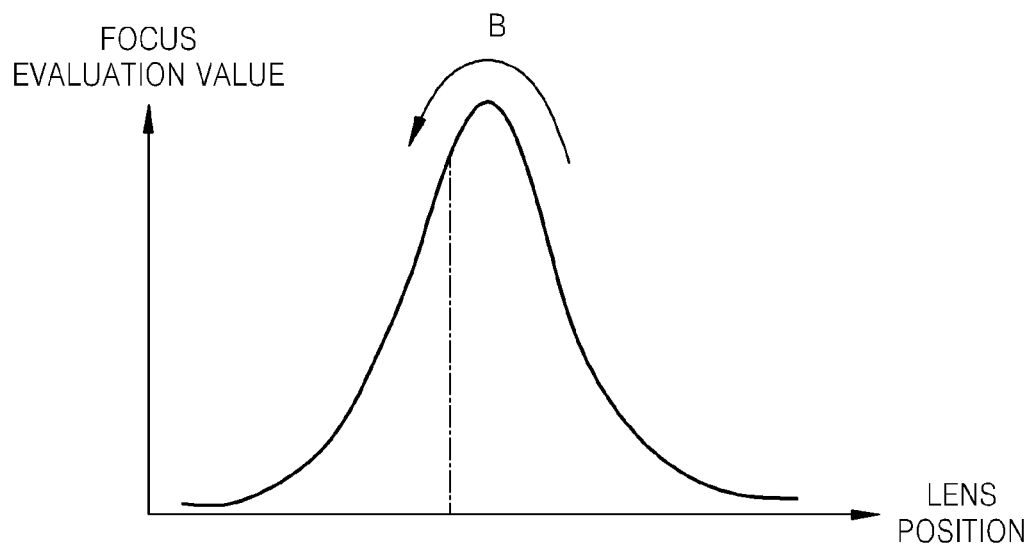
Figure 6:
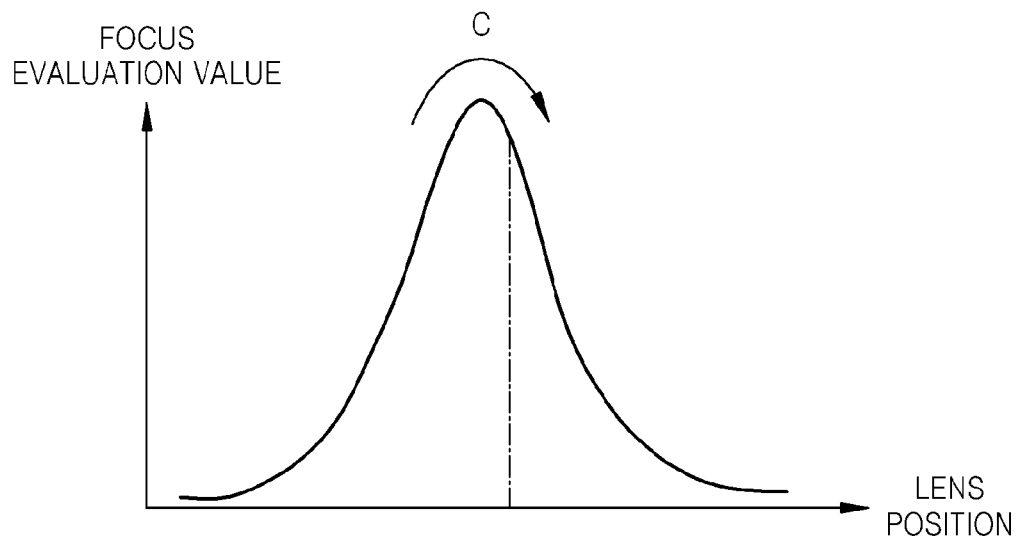
Figure 7:
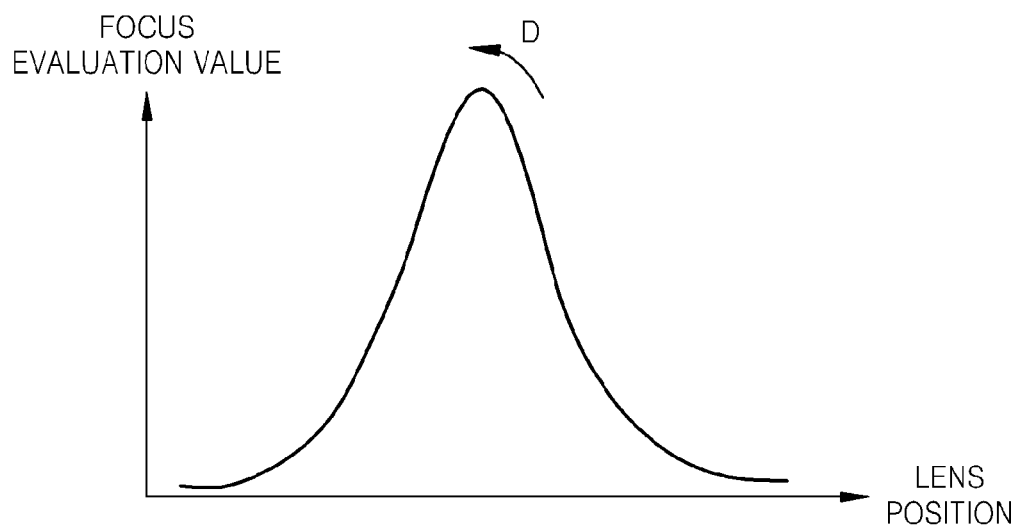

Referring to FIG. 4, the focus lens is scanned at a high speed in a first direction so as to detect the peak of the focus evaluation values. The scanning operation is an operation of obtaining the focus evaluation values by operating the focus lens. This is referred to as "A-driving". A peak of the focus evaluation values is detected. If the peak of the focus evaluation values is exceeded, the focus lens is driven at a lower speed than in FIG. 4 in a second direction that is different from the first direction of FIG. 4, thereby detecting a more precise peak of the focus evaluation values. This is referred to as "B-driving". The position of the focus lens corresponding to the peak detected in FIG. 5 may be determined as a target position. As illustrated in FIG. 6, a scanning operation is performed in a direction different from that of FIG. 5, i.e., the first direction that is the same as that of FIG. 4. This is referred to as "C-driving". For backlash compensation, i.e., in order to move the focus lens to the target position of the focus lens in the second direction that is the same as the direction in which the focus lens is driven to its target position, the scanning operation is performed once more in the first direction as in FIG. 6. The scanning operation in FIG. 6 may not be a scanning operation for obtaining the focus evaluation values but focus lens driving. However, this should not be construed as limiting. In order to use the scanning operation in detecting the moving object, the scanning operation of obtaining the focus evaluation values may be performed in FIG. 6. Referring to FIG. 7, the focus lens is moved to the target position so as to finally drive the focus lens in the same direction as that of FIG. 5, corresponding to an operation of moving the focus lens to a final target position, i.e., the second direction. Thus, backlash may be compensated for. This is referred to as "D-driving".

Figure 8:
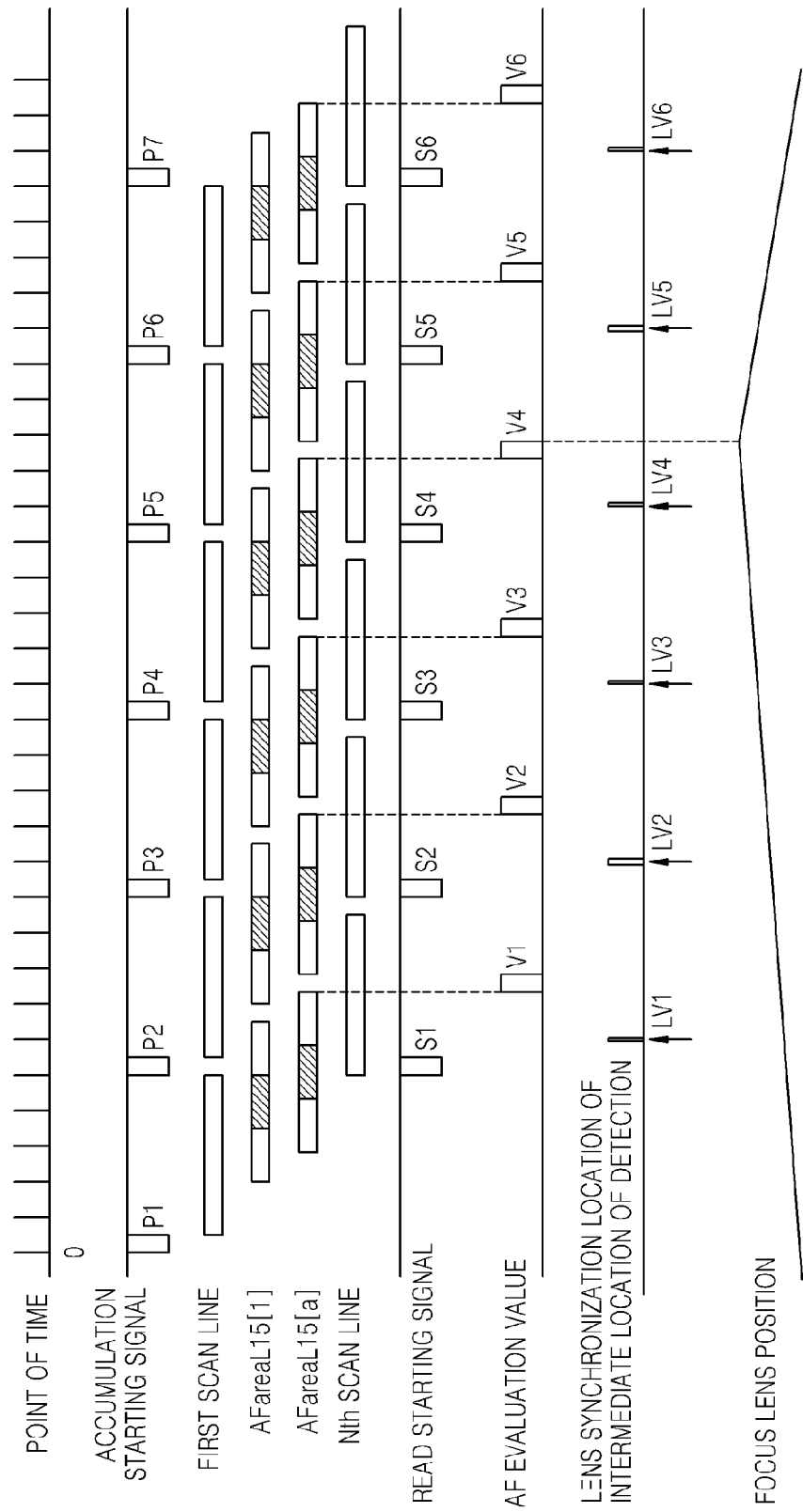
FIG. 8 illustrates the relationship between the time at which focus evaluation values need to be obtained and the position of a focus lens, according to an embodiment.

FIG. 8 illustrates the relationship between the time at which focus evaluation values need to be obtained and the position of the focus lens, according to an embodiment.

From the description above, FIG. 8 illustrates a time scale, an image signal output time VD (accumulation starting signal P1, P2, . . . ), a first scan line of the uppermost portion of a screen, a scan line of the lowermost portion of a focus detecting area (AFareaL 15[1] and AFareaL 15[$a$]), a scan line of the lowermost portion of the screen (Nth scan line)), an image information reading time (read starting signal S1, S2, . . . ), a focus evaluation value obtaining time, a focus detecting image central position time (lens synchronization location of intermediate location of detection LV1, LV2, . . . ), and a focus lens position. In this regard, if a fourth focus evaluation value V4 is obtained and it is determined that the fourth focus evaluation value V4 is smaller than the current focus evaluation values, the time corresponds to a point of time at which it is determined that the peak of the focus evaluation values is exceeded. Thus, the focus lens is driven in a reverse direction from the position of the focus lens corresponding to the fourth focus evaluation value V4. Thus, it may be determined that the target position of the focus lens is near the position of the focus lens in which a third focus evaluation value V3 is obtained. It may be determined that the position of the focus lens corresponding to the peak of the focus evaluation values is near LV3. If the focus evaluation values obtained after the peak of the focus evaluation values is exceeded are smaller than the peak, reverse driving is performed. In this regard, in reverse driving after the fourth focus evaluation value V4, the focus lens is driven at a constant speed that is lower than the current speed so as to precisely detect the target position of the focus lens. The operations correspond to those of FIGS. 4 and 5 described above. Although not shown, reverse driving as in FIG. 6 is performed.

Figure 9:
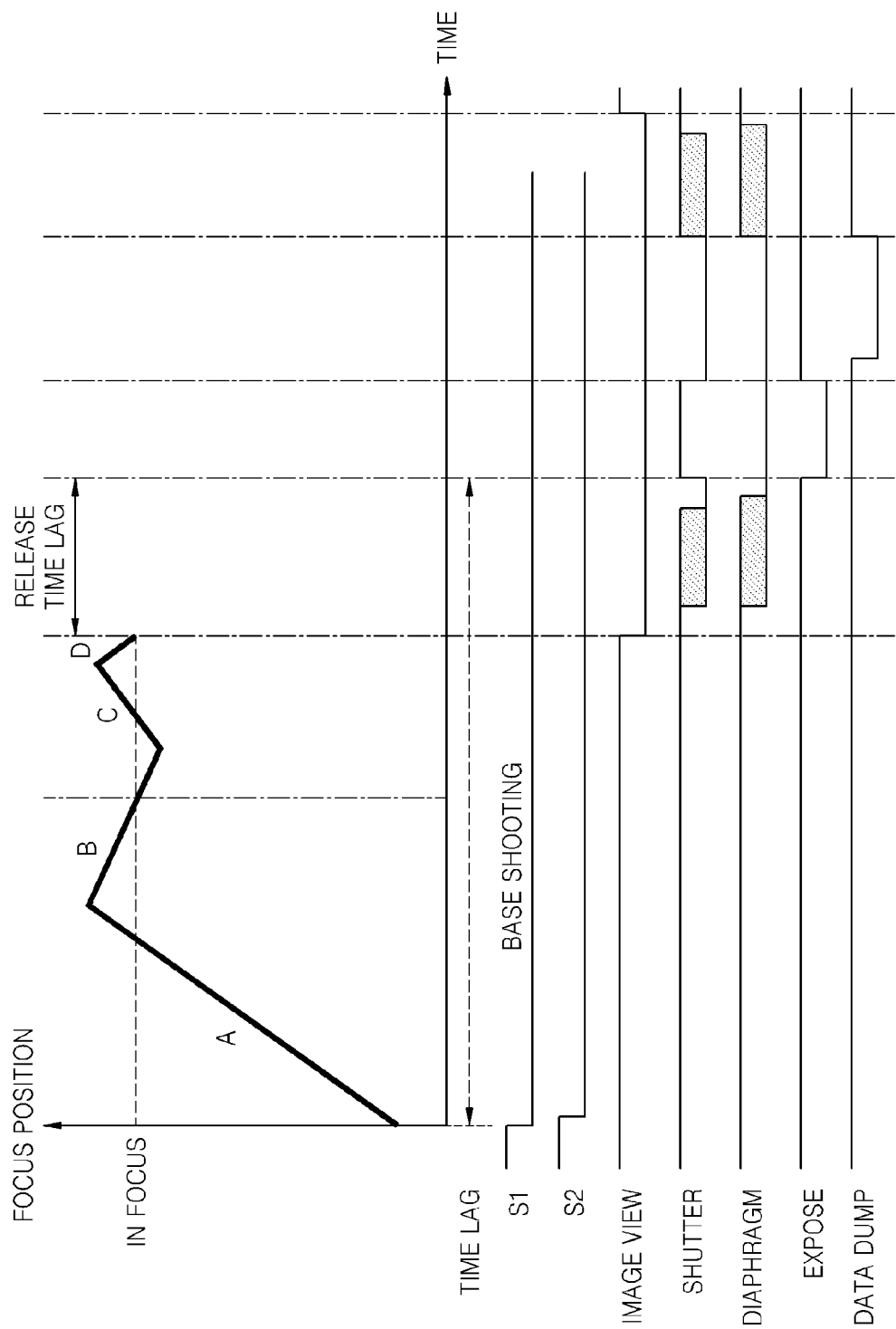
FIG. 9 illustrates a timing diagram of the relationship between the time of a camera and the position of a focus lens during which the operation S1 and the operation S2 are simultaneously performed.

FIG. 9 illustrates a timing diagram of the relationship between the time of a camera and the position of a focus lens. Referring to FIG. 9, the horizontal axis represents time and the vertical axis represents a focus lens position. Sequentially, the following timing diagram represents an operation S1 performed by half-pressing a shutter release button, an operation S2 performed by fully pressing the shutter release button, an image view signal that is a display of a captured image, a shutter signal, a diaphragm signal, an exposure signal by using an imaging sensor, and an exposure image read signal.

FIG. 9 illustrates a timing diagram of the relationship between the time of a camera and the position of a focus lens during which the operation S1 and the operation S2 are simultaneously performed. When the operation S1 is performed and an AF operation starts, the focus lens is driven in a first direction at a constant high speed. This is A-driving illustrated in FIG. 4. If the peak of the focus evaluation values is exceeded, the focus lens is driven at a constant low speed in the second direction opposite to the first direction. This is B-driving corresponding to FIG. 5. Here, the target position of the focus lens corresponding to the peak of the focus evaluation values is obtained. The focus lens is driven in the first direction again. This is C-driving corresponding to FIG. 6. Last, the focus lens is driven in the second direction for backlash compensation. This is D-driving corresponding to FIG. 7. The focus lens is driven to the target position, thereby completing the AF operation. A display of the captured image is erased, and the shutter is first closed. Simultaneously, a diaphragm is tightened until the diaphragm is properly tightened from the state where the diaphragm is opened. At least one of the operation of erasing the display of the captured image, firstly closing the shutter, and properly tightening the diaphragm may be included in an exposure preparation operation. When the exposure preparation operation is completed, the shutter is opened. The time at which the focus lens is moved to the target position and is in an in-focus state and then the exposure preparation operation is completed is referred to as release time lag. Also, when the operation S2 is performed after the focus lens is moved to the target position and is in an in-focus state, the time at which the shutter is opened after the operation S2 is performed is referred to as release time lag.

When the shutter is opened, the imaging device starts exposure, and when proper exposure is completed, the shutter is closed again. Then, information accumulated on the imaging device is read. After the information is read, the shutter is opened again, and the diaphragm is opened. However, when the subject moves in the direction of the optical axis of the lens, there is a time lag from the time at which the target position of the focus lens for an in-focus operation is detected to the time at which the focus lens is finally moved to the target position and is in an in-focus state, as illustrated in FIG. 9. The subject may be moved even during the time lag. Also, the subject may be moved even during the time of the release time lag. Thus, a focus deviation between focusing in the position of the focus lens in the in-focus state and focusing in actual exposure may occur. In order to minimize the focus deviation, an AF driving time up to exposure is reduced. Reduction in the AF driving time up to the exposure may cause an AF speed to increase even when a general subject is photographed as well as when a moving subject is photographed.

Figure 10:
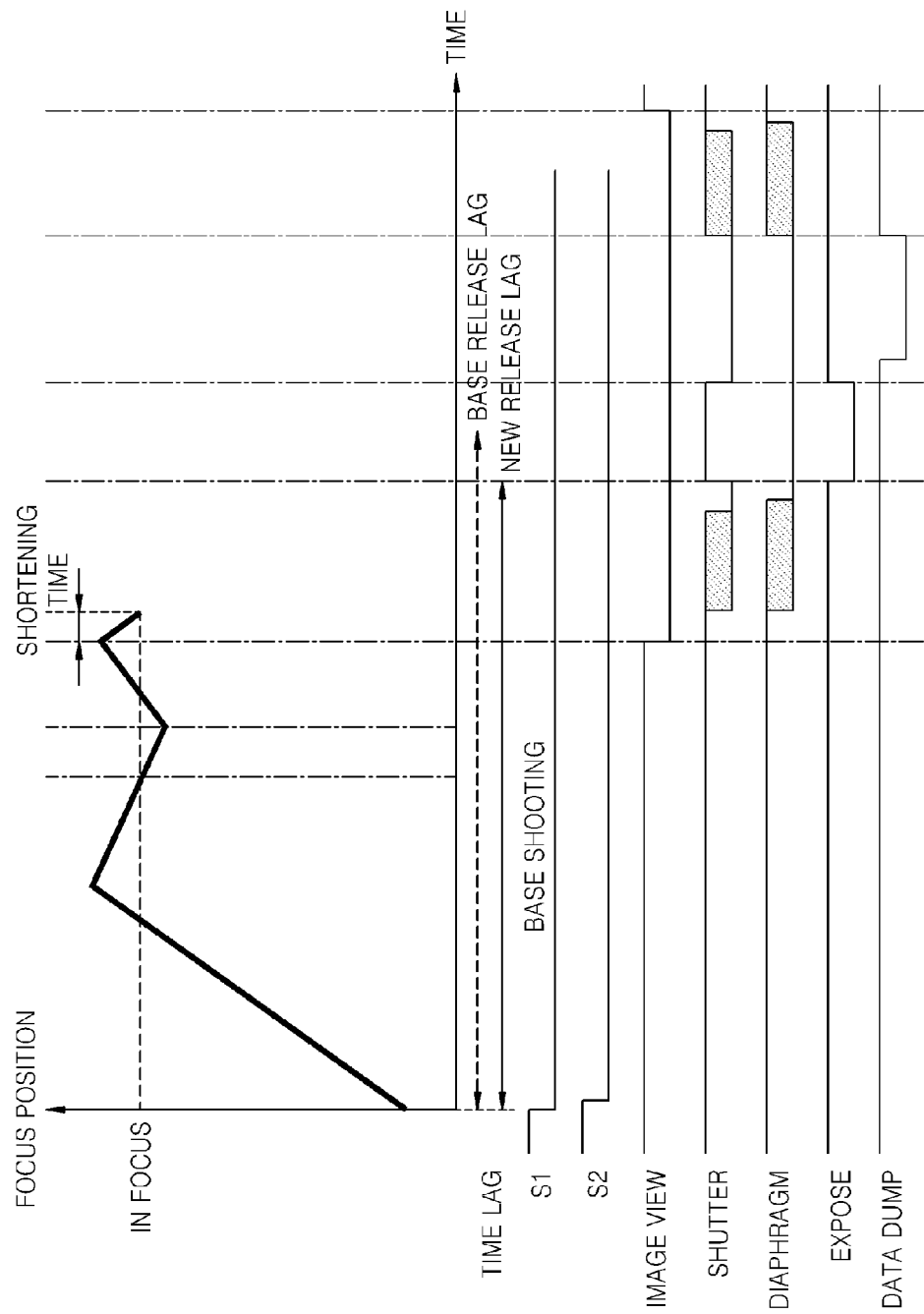
FIG. 10 illustrates a timing diagram of a reduction in an AF driving time up to exposure, according to an embodiment.

FIG. 10 illustrates a timing diagram of a reduction in the AF driving time up to exposure, according to an embodiment. C-driving of FIG. 6 and D-driving of FIG. 7 among AF driving illustrated in FIGS. 4 through 7 are driving for backlash compensation. D-driving of FIG. 7 is performed after an image view is not displayed, i.e., during an exposure preparation time period. Since the shutter is first closed after the image view is not displayed, light does not reach the imaging device. Thus, the focus evaluation values cannot be obtained. In the related art, the AF operation is completed before the exposure preparation is performed. However, in order to consider the case where the moving subject is photographed and in order to reduce an AF time, the backlash driving may be performed during a time period when the focus evaluation values need not to be obtained. Thus, time for backlash compensation may be reduced by about 30 ms. A release time lag may be reduced as a solid line from a dotted line.

Figure 11:
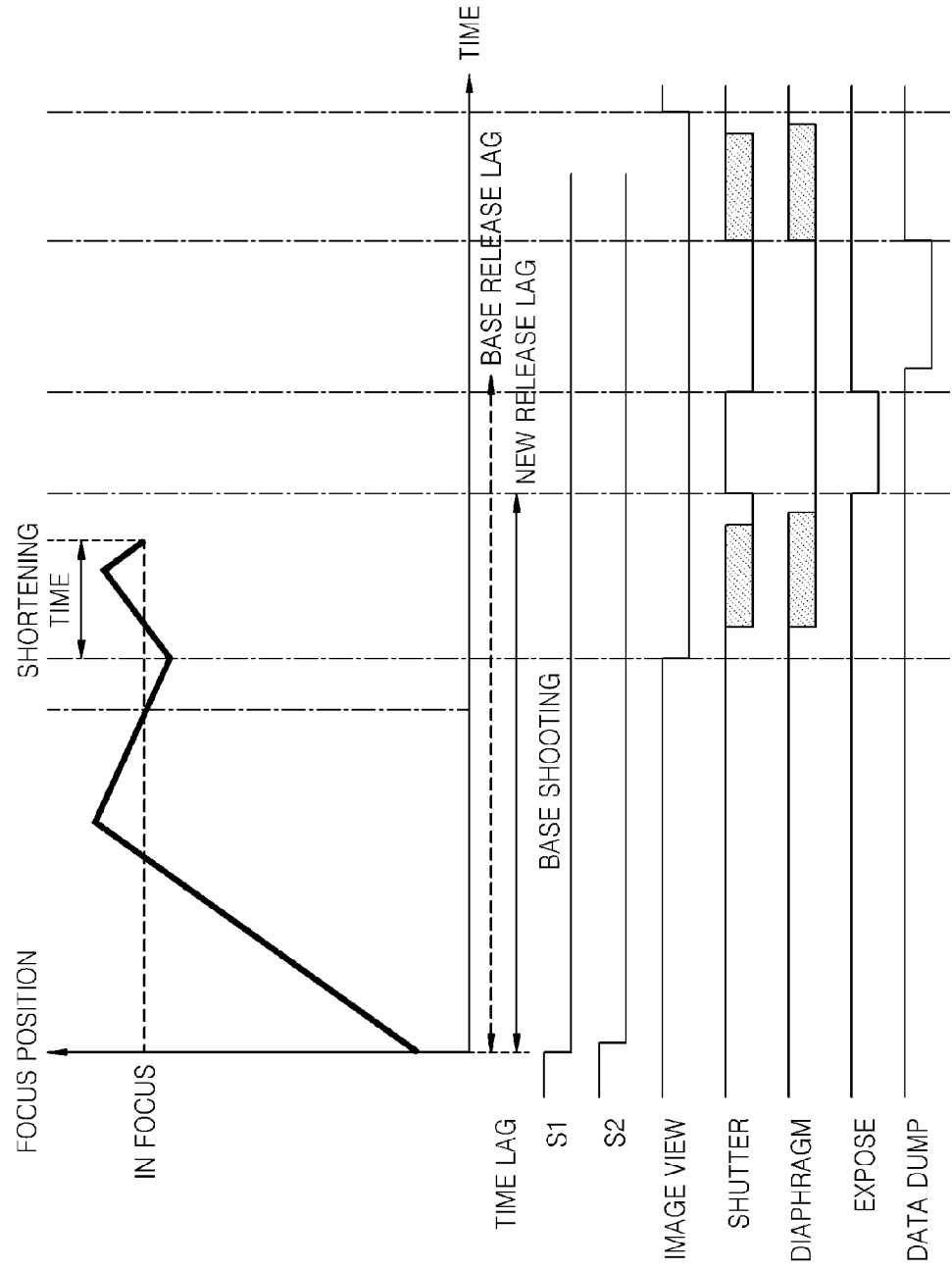
FIG. 11 illustrates a timing diagram of a reduction in an AF driving time up to exposure, according to another embodiment.

FIG. 11 illustrates a timing diagram of a reduction in the AF driving time up to exposure, according to another embodiment. When the amount of backlash is small or a release time lag time is long, the control illustrated in FIG. 11 may be performed. In FIG. 10, only D-driving of FIG. 7 is performed during the release time lag, and in FIG. 11, both C-driving of FIG. 6 and D-driving of FIG. 7 are performed. Thus, the release time lag of about 70 ms may be substantially reduced, and the AF time may also be reduced. When a moving subject is photographed, focusing may be easily performed.

Figure 12:
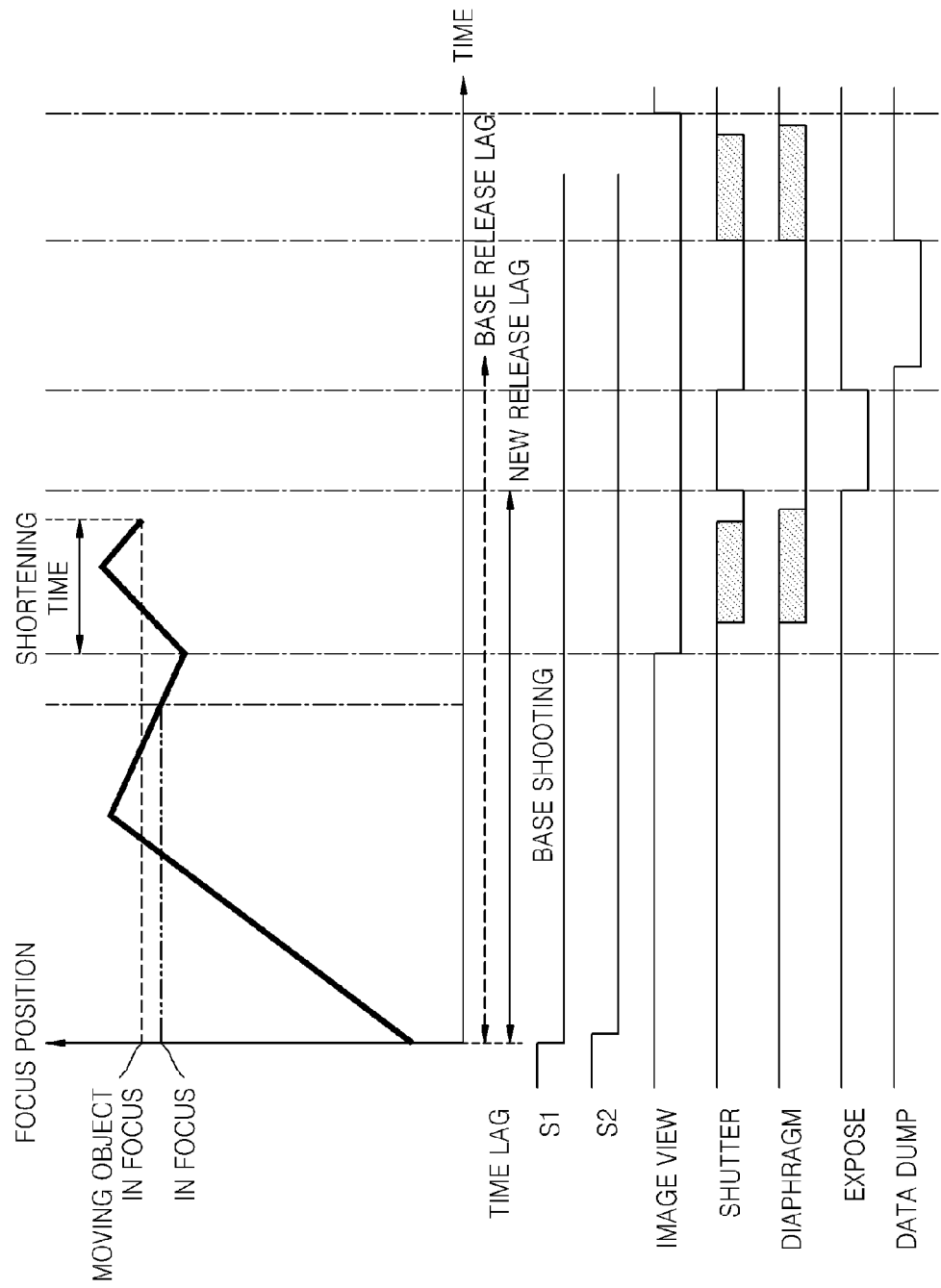
FIG. 12 illustrates a timing diagram of moving object correction driving performed during a release time lag, according to another embodiment.

FIG. 12 illustrates a timing diagram of moving object (moving subject) correction driving performed during a release time lag, according to another embodiment. In the current embodiment, it is assumed that the speed of the moving object is measured up to a release operation. If a release signal is input, the amount of movement in which the moving object moves in a focusing direction is obtained during the already-known release time lag time, and the amount of movement is additionally driven when C-driving of FIG. 6 is performed. Also, when D-driving of FIG. 7 is performed, the focus lens is finally controlled to the target position, and exposure is performed. Also, on the vertical axis of FIG. 12, a starting point is an infinite position, and the above is a close position. It is also assumed that the moving object comes close to a camera. When the moving object moves in a direction in which the moving object gets close to the camera, the target position of the focus lens with respect to the moving object during exposure is closer than the target position of the focus lens detected by B-driving of FIG. 5, as illustrated in FIG. 12. In this regard, when the release signal is input, moving object correction corresponding to the release time lag is performed during C-driving of FIG. 6, and due to D-driving of FIG. 7, the focus lens is driven to the final target position of the focus lens corresponding to an in-focus state of the moving object. Thus, photographing with good focusing may be performed even on the moving object.

Also, although not shown, when the moving object is distant from the camera, the direction of the moving object is reverse, and the moving object may be corrected by not C-driving of FIG. 6 but D-driving of FIG. 7.

{Camera Sequence}

Hereinafter, a method of controlling a digital camera as a method of controlling an auto-focusing apparatus according to an embodiment of the present invention will be described with reference to the attached drawings. The following embodiments relate to a digital camera as the auto-focusing apparatus. However, the present invention is not limited thereto, and the auto-focusing apparatus may be applied to various types of digital devices such as a mobile phone, a smart phone, a portable multimedia player (PMP), and the like.

Figure 13:
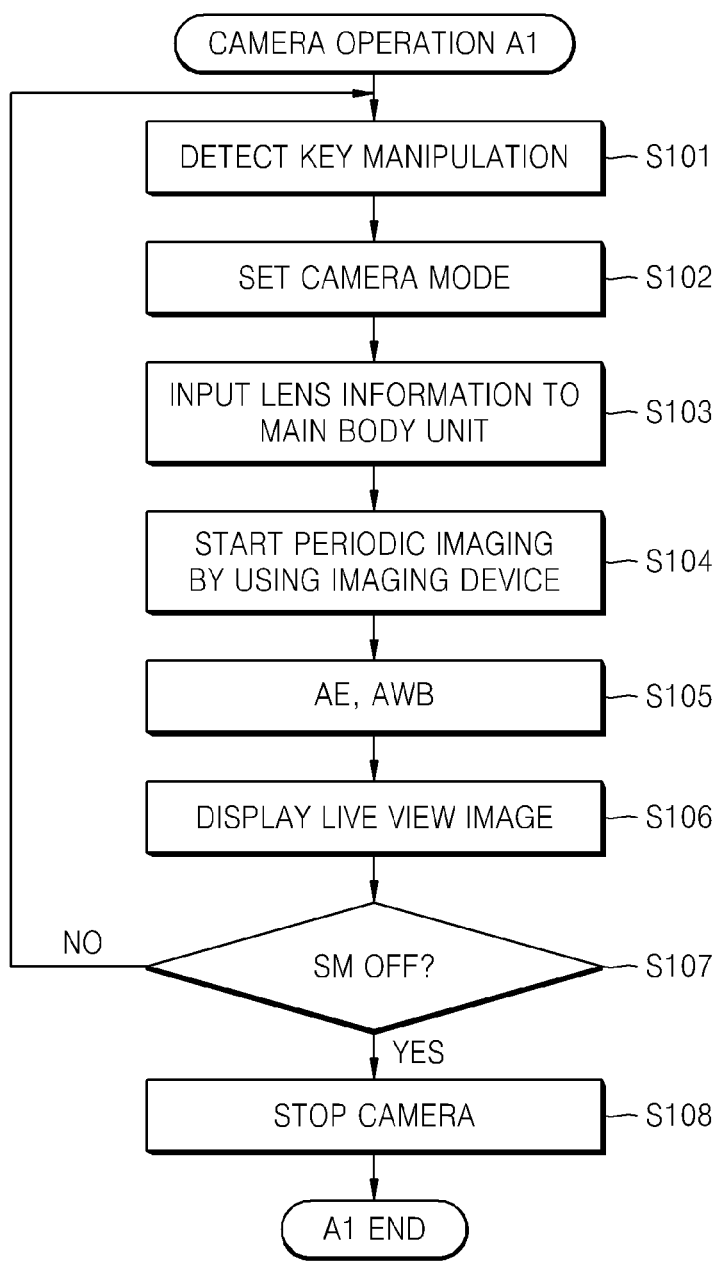
FIG. 13 illustrates a flowchart of an operation A1 when a camera operates, according to an embodiment.

FIG. 13 illustrates a flowchart of an operation A1 when a digital camera operates, according to an embodiment. Referring to FIG. 13, a main switch (SM) of the camera is turned on and the camera operates, and manipulation of a key that is a manipulation unit is detected in operation S101. Next, a camera mode is set using a mode dial or menu button of the camera in operation S102. Subsequently, pieces of lens information required for an operation of the camera is input to a main body unit of the camera from an exchangeable lens in operation S103. The pieces of lens information are parameters of a lens stored in the memory unit 210 within a control circuit (lens controller 110 of FIG. 1) and may include information required for AF, AE, AWB, and image quality control. In an exchangeable lens type camera as illustrated in FIG. 1, lens information is input to the main body unit from the lens in operation S103. However, in a lens integrated camera illustrated in FIG. 2, set information may be obtained from key manipulation. A switch S1 may be turned on by half-pressing a shutter release button, thereby starting an AF operation.

Periodic imaging of an imaging device starts in operation S104. An AE operation is performed by performing light measurement information, and an AWB operation is performed in operation S105. Next, a live view image is displayed in operation S106. Subsequently, it is determined whether the main switch SM is turned off in operation S107. If it is determined that the main switch SM is not turned off, the operation flow proceeds back to operation S101, and operations after operation S101 are repeatedly performed. Otherwise, if it is determined that the main switch SM is turned off, the camera stops in operation S108 and the operation A1 of the camera is terminated.

Figure 14:
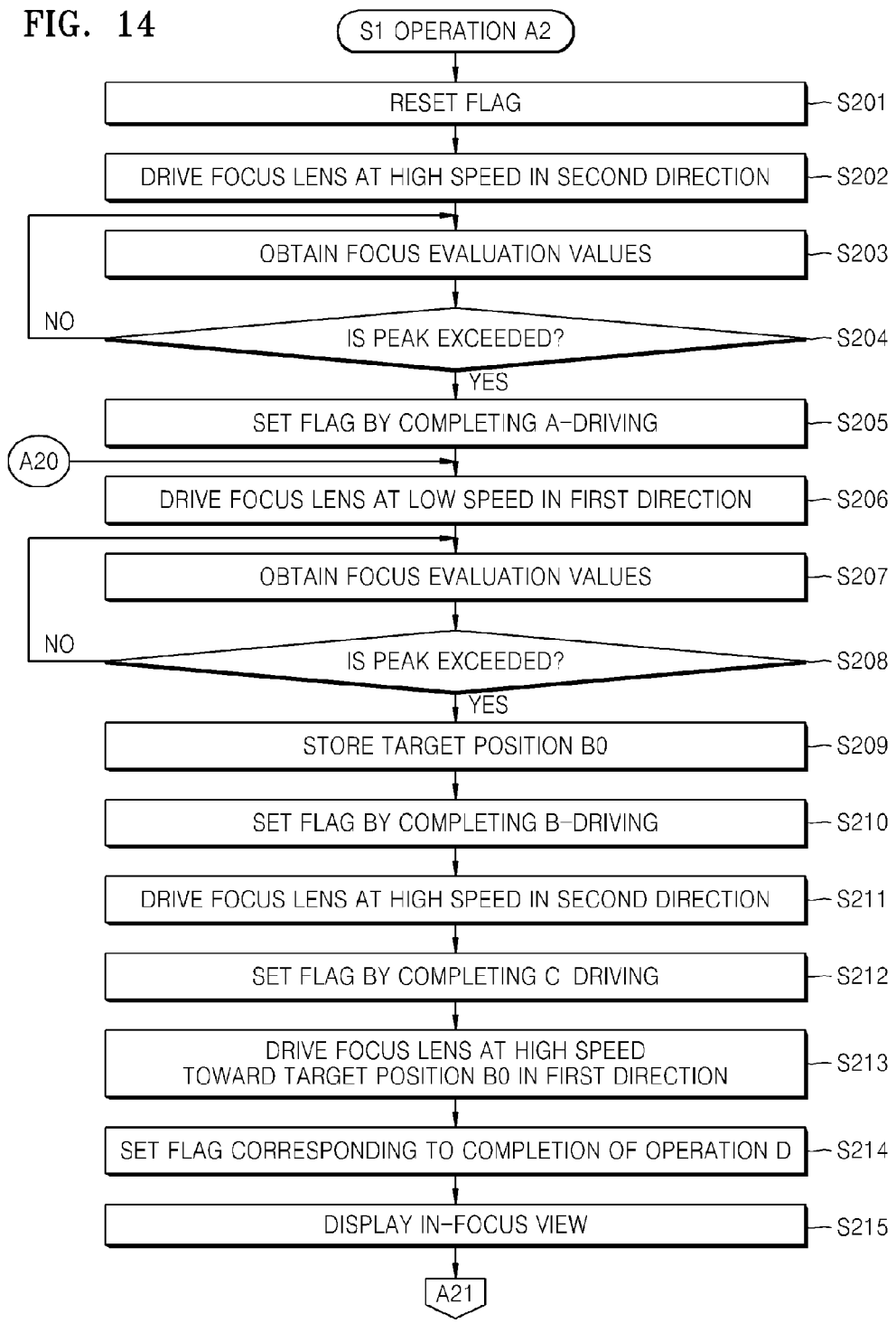
FIGS. 14 and 15 illustrate flowcharts of an S1 operation A2 when the switch S1 of the camera is turned on, according to an embodiment.
Figure 15:
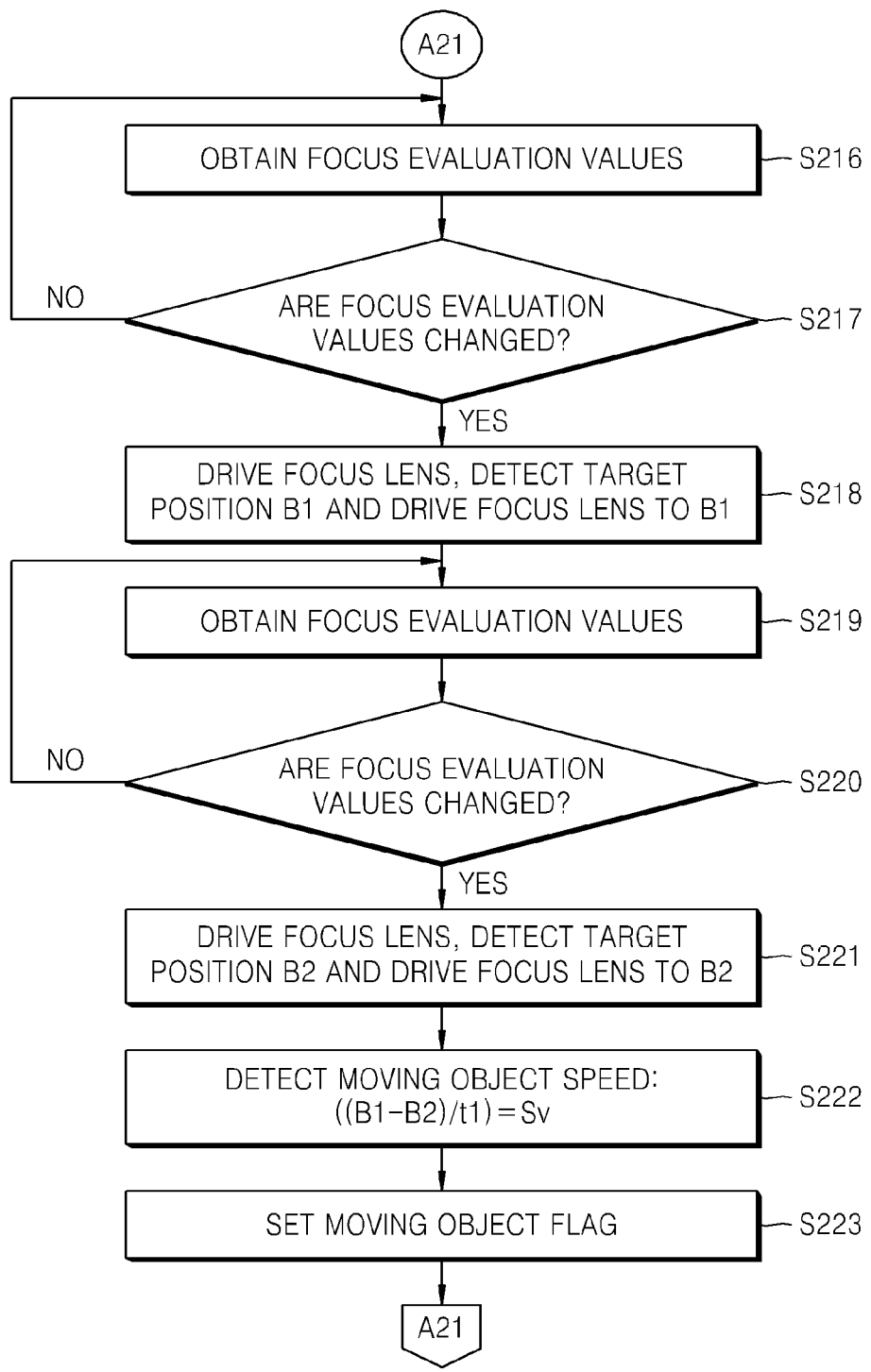

FIGS. 14 and 15 illustrate flowcharts of an S1 operation A2 when the switch S1 of the camera is turned on, according to an embodiment.

When a live view image is displayed, if the switch S1 is turned on by half-pressing the shutter release button, the S1 operation A2 illustrated in FIG. 14 is performed.

In detail, referring to FIG. 14, in the S1 operation A2, the AF operation described with reference to FIG. 9 is performed. First, a flag is reset in operation S201. A focus lens is driven at a constant high speed in a second direction in operation S202. Next, focus evaluation values are obtained by driving the focus lens in operation S203. This corresponds to AF scanning performed by an operation A of FIG. 9. Subsequently, it is determined whether a peak of the focus evaluation values is exceeded in operation S204. If it is determined that the peak of the focus evaluation values is not exceeded, the operation flow proceeds back to operation S203, and AF scanning is repeatedly performed. Otherwise, if it is determined that the peak of the focus evaluation values is exceeded, a flag is set by completing A-driving of FIG. 9 in operation S205. Next, the focus lens is driven at a constant low speed in a first direction in operation S206. This is AF scanning corresponding to an operation B of FIG. 9. Next, focus evaluation values are obtained in operation S207, and it is determined whether a peak of the focus evaluation values is exceeded in operation S208. AF scanning is repeatedly performed until the peak of the focus evaluation values is exceeded. Here, the position of the focus lens corresponding to the detected peak is a target position B0 that is properly focused. The target position B0 is stored in operation S209. A flag is set by completing B-driving in operation S210. Next, driving control for correcting a backlash error is performed.

Driving control for backlash correction is performed from operation S211. In driving for backlash correction, the focus evaluation values need not to be obtained. First, the focus lens is driven at a constant high speed in a second direction in operation S211. This corresponds to C-driving of FIG. 9. A flag is set by completing C-driving in operation S212. Next, the focus lens is driven at a high speed toward the target position B0 in the first direction in operation S213. This corresponds to an operation D of FIG. 9. Here, a flag corresponding to completion of the operation D of FIG. 9 is set in operation S214, and AF is completed. Subsequently, an in-focus view is displayed in operation S215. AF is terminated, and the operation flow proceeds back to the general operation A1 of FIG. 13.

In the current embodiment, an operation A21 (FIG. 15) is performed so as to determine a moving object or to obtain the speed of the moving object. In detail, referring to FIG. 15, in order to detect whether a captured image is changed, focus evaluation values are obtained in operation S216. Next, it is determined whether the focus evaluation values are changed in operation S217. If it is determined that the focus evaluation values are not changed, calculation of the focus evaluation values is continuously repeated in operation S216. Otherwise, if it is determined that the focus evaluation values are changed, it is determined that a subject is changed and that the subject may be the moving object, and operation S218 is performed. The operations S206 through S214 are repeatedly performed in operation S218. In other words, by driving the focus lens, a target position B1 of the focus lens is detected, and the focus lens is driven to the target position B1. Also in operations S219 and S220, it is determined whether the focus evaluation values are changed, as described above, and if it is determined that the focus evaluation values are changed, an operation S221 is performed. Also in operation S221, driving of the focus lens is performed like in operation S218, thereby detecting a target position B2 of the focus lens and driving the focus lens to the target position B2 in operation S221. If the focus evaluation values are continuously changed in operations S217 and S220, the subject is determined as a moving object, and a moving object speed $S v$ is obtained from the target positions B1 and B2 and a time difference t1 between the target positions B1 and B2 ($S v=((B1-B2)/t1)$) in operation S222. Next, a moving object flag is set in operation S223. The operation flow proceeds back to the operation A21, and determination of the moving object is repeatedly performed.

Figure 16:
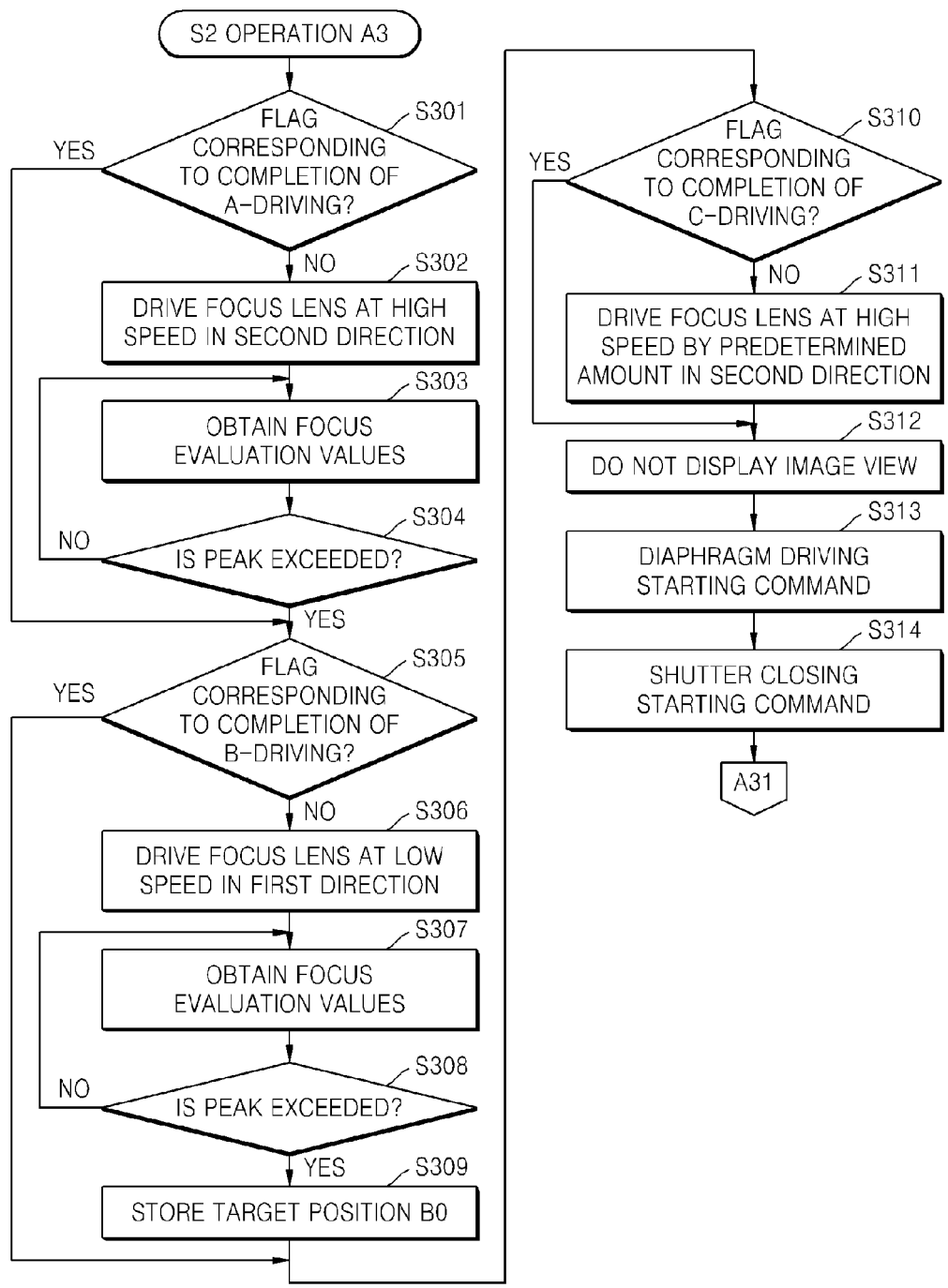
FIGS. 16 and 17 illustrate flowcharts of an S2 operation A3 when the switch S2 of the camera is turned on, according to an embodiment.
Figure 17:
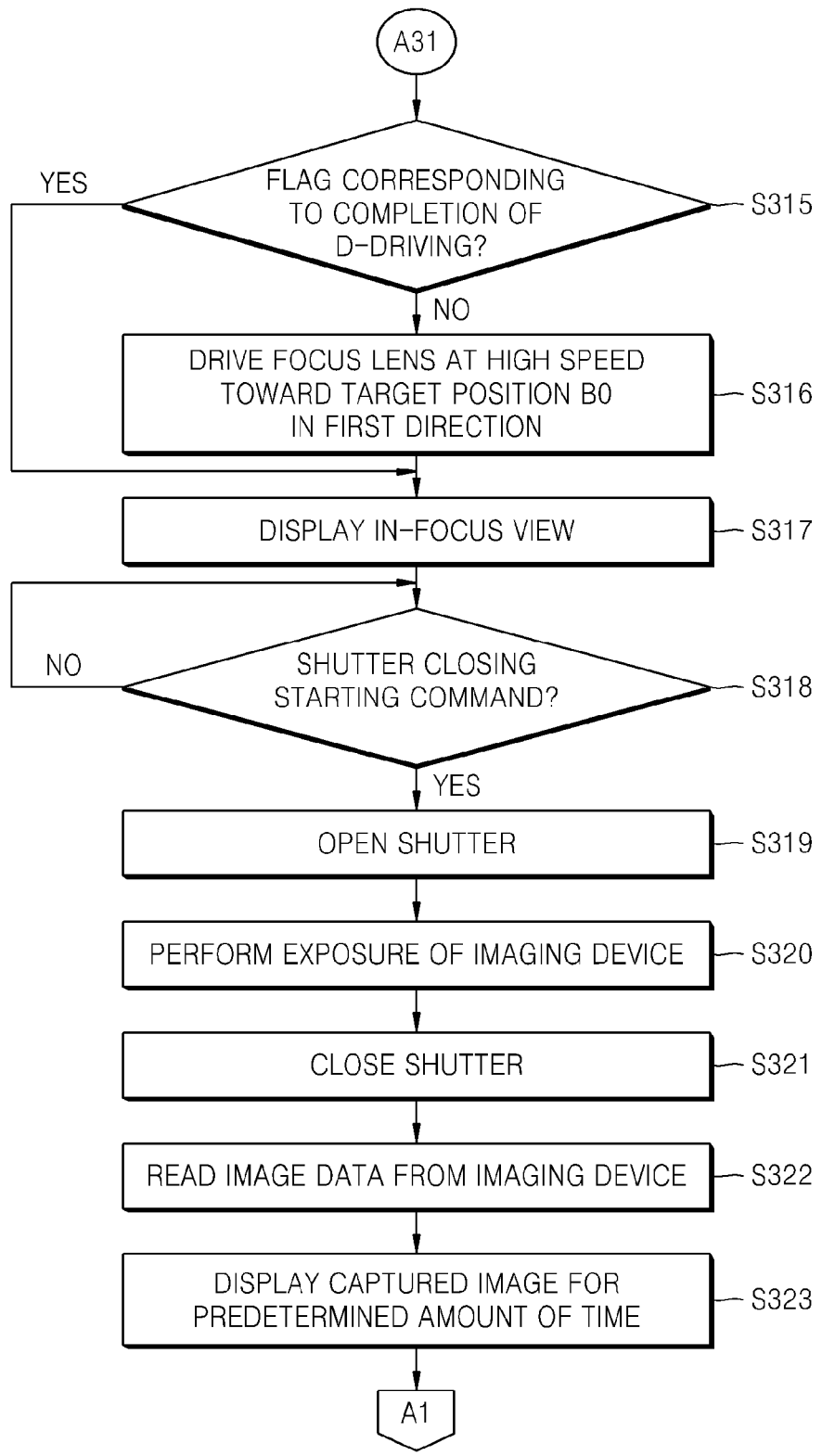

FIGS. 16 and 17 illustrate flowcharts of an S2 operation A3 when the switch S2 of the camera is turned on, according to an embodiment.

When a switch S2 is turned on by fully pressing the shutter release button during AF or when AF is completed and the camera is in an in-focus state, as described above, the S2 operation A3 illustrated in FIG. 16 starts. The switch S2 is not turned on only when AF is successfully performed and the camera is in the in-focus state and may be turned on before AF is completed. When the S1 operation A2 is performed, the subject is changed due to a release time during an AF operation. Here, the driving state is determined while the operation S1 is performed. First, a flag corresponding to completion of A-driving is checked in operation S301. If the flag corresponding to completion of A-driving is set, A-driving has been completed, and thus, the operation flow skips to operation S305. Otherwise, if the flag corresponding to completion of A-driving is not set, A-driving is performed in operation S302 to operation S304. If a flag corresponding to completion of B-driving is checked in operation S305 and the flag corresponding to completion of B-driving is set, it is determined that B-driving is completed and the operation flow skips to operation S310. Otherwise, if the flag corresponding to completion of B-driving is not set, B-driving is performed in operation S306 to operation S308. A target position B0 of the focus lens obtained by B-driving is stored in operation S309. Next, a flag corresponding to completion of C-driving is checked in operation S310. If the flag corresponding to completion of C-driving is set, it is determined that C-driving is completed. The operation flow skips to operation S312.

Otherwise, if the flag corresponding to completion of C-driving is not set, C-driving is performed in operation S311. An image view is not displayed in operation S312. In detail, a live view is not displayed. In operation S313, a diaphragm driving starting command is output. In operation S314, a command for closing a shutter that is generally in an open state is output.

After operation S314 is performed, an operation A31 illustrated in FIG. 17 may be performed. In detail, referring to FIG. 17, it is determined whether a flag corresponding to completion of D-driving is set, in operation S315. If it is determined that the flag corresponding to completion of D-driving is set, D-driving is terminated, and thus, the operation flow skips to operation S317. Otherwise, if D-driving is not terminated, D-driving is performed in operation S316. After operation S316, driving is performed during a release time lag. If the flag corresponding to completion of D-driving is checked in operation S315 and D-driving is terminated, the operation flow skips to operation S317. If D-driving is not terminated, D-driving is performed in operation S316. D-driving may be performed during the release time lag.

An in-focus view is displayed in operation S317. Since an image view is not displayed on a screen during the release time lag, when there is an in-focus view displayed outside the screen, the in-focus view is not displayed. In operation S318, it is checked whether a photographing signal for terminating tightening of the diaphragm and closing the shutter is input. If the photographing signal is input, in operation S319, the shutter is opened, and in operation S320, exposure of the imaging device is performed. In operation S321, the shutter is closed after exposure control is properly performed. In operation S322, image data is read from the imaging device on which the image data is accumulated, in the state where the shutter is closed. The captured image read in operation S323 is displayed for a predetermined amount of time. The operation flow proceeds back to operation A1 of FIG. 13.

Figure 18:
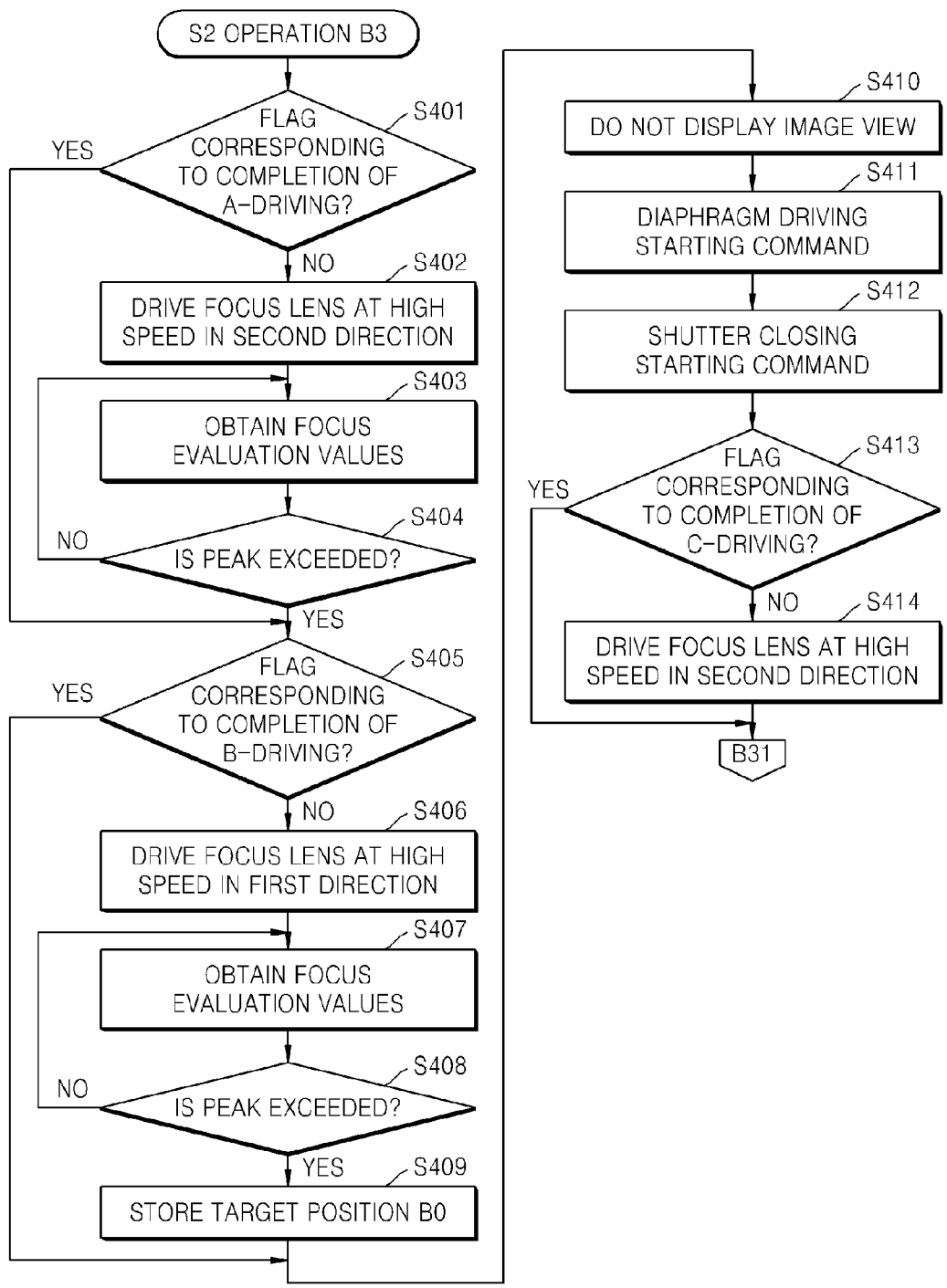
FIGS. 18 and 19 illustrate flowcharts of an S2 operation B3 when the switch S2 of the camera is turned on, according to another embodiment.
Figure 19:
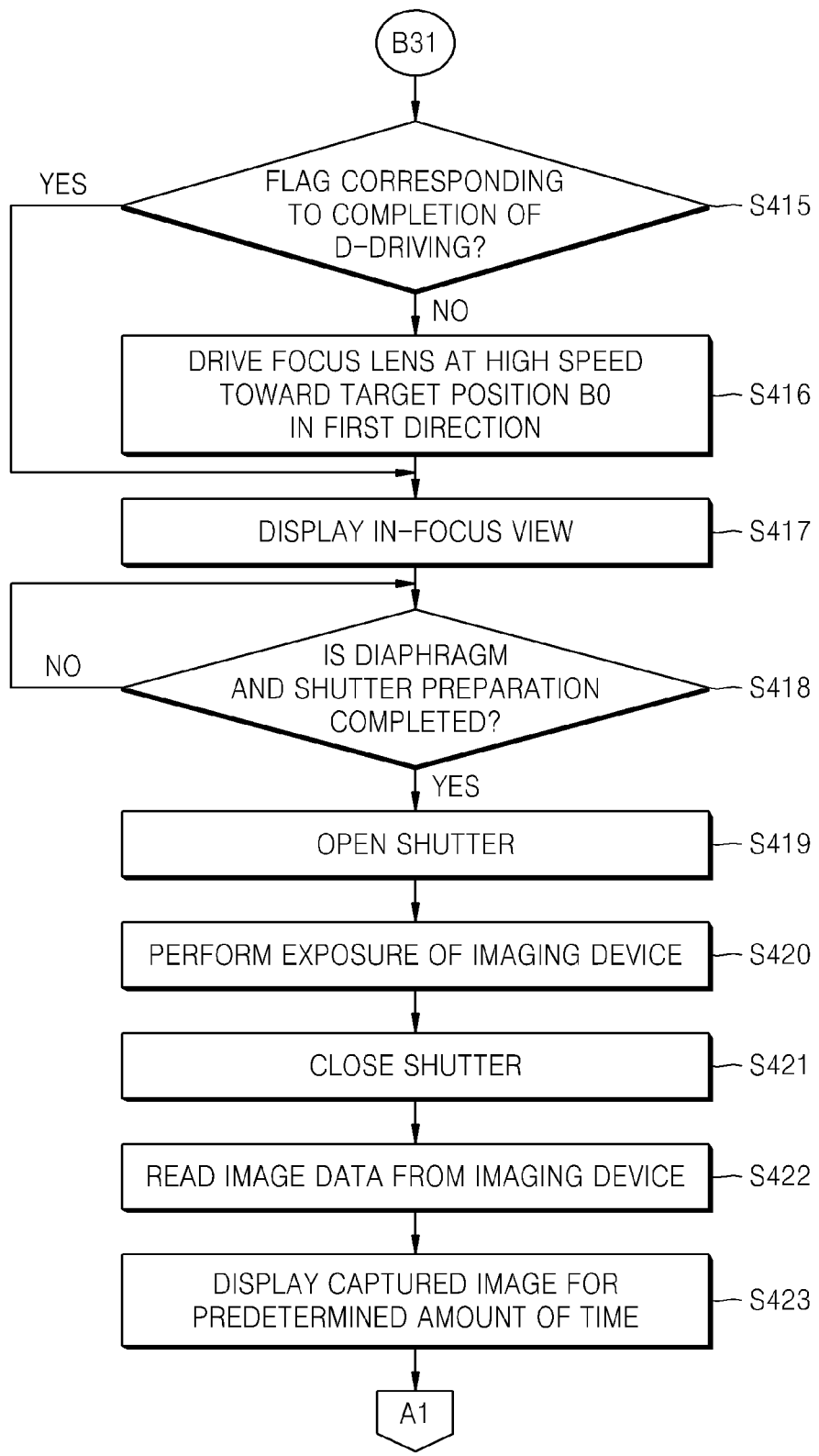

FIGS. 18 and 19 illustrate flowcharts of an S2 operation B3 when the switch S2 of the camera is turned on, according to another embodiment. The S2 operation B3 is driving during the release time lag and is another embodiment of C-driving and D-driving illustrated in FIG. 11. A main description of the S2 operation B3 to be described with reference to FIGS. 18 and 19 is the same as that of FIGS. 16 and 17 and thus, differences therebetween will be described as follows.

Referring to FIG. 18, operations S401 through S409 describe that A-driving and B-driving are performed according to a release time during an AF operation in the operation S1. The operations S401 through S409 are the same as their corresponding ones of FIG. 16, and thus, a detailed description thereof is not provided. In operation S410, an image view is not displayed; in operation S411, diaphragm driving starts; and in operation S412, the shutter starts to be closed. In operation S413, a flag corresponding to completion of C-driving is checked. If the flag corresponding to completion of C-driving is set, it may be determined that C-driving has been completed. If C-driving has been completed, the operation flow skips to operation S415 of FIG. 19. Otherwise, if C-driving has not been completed, C-driving is performed. In detail, the focus lens is driven at a high speed in a second direction in operation S414. Next, a flag corresponding to completion of D-driving is checked in operation S415. If D-driving has been completed, the operation flow skips to operation S417. Otherwise, if D-driving has not been completed, D-driving is performed in operation S416. Operations S410 through S417 correspond to C-driving and D-driving during the release time lag illustrated in FIG. 11. In addition, operations of FIG. 19 after operation S415 are the same as their corresponding ones in FIG. 17 that describe operations after operation S415 and thus, a detailed description thereof is not provided.

Figure 20:
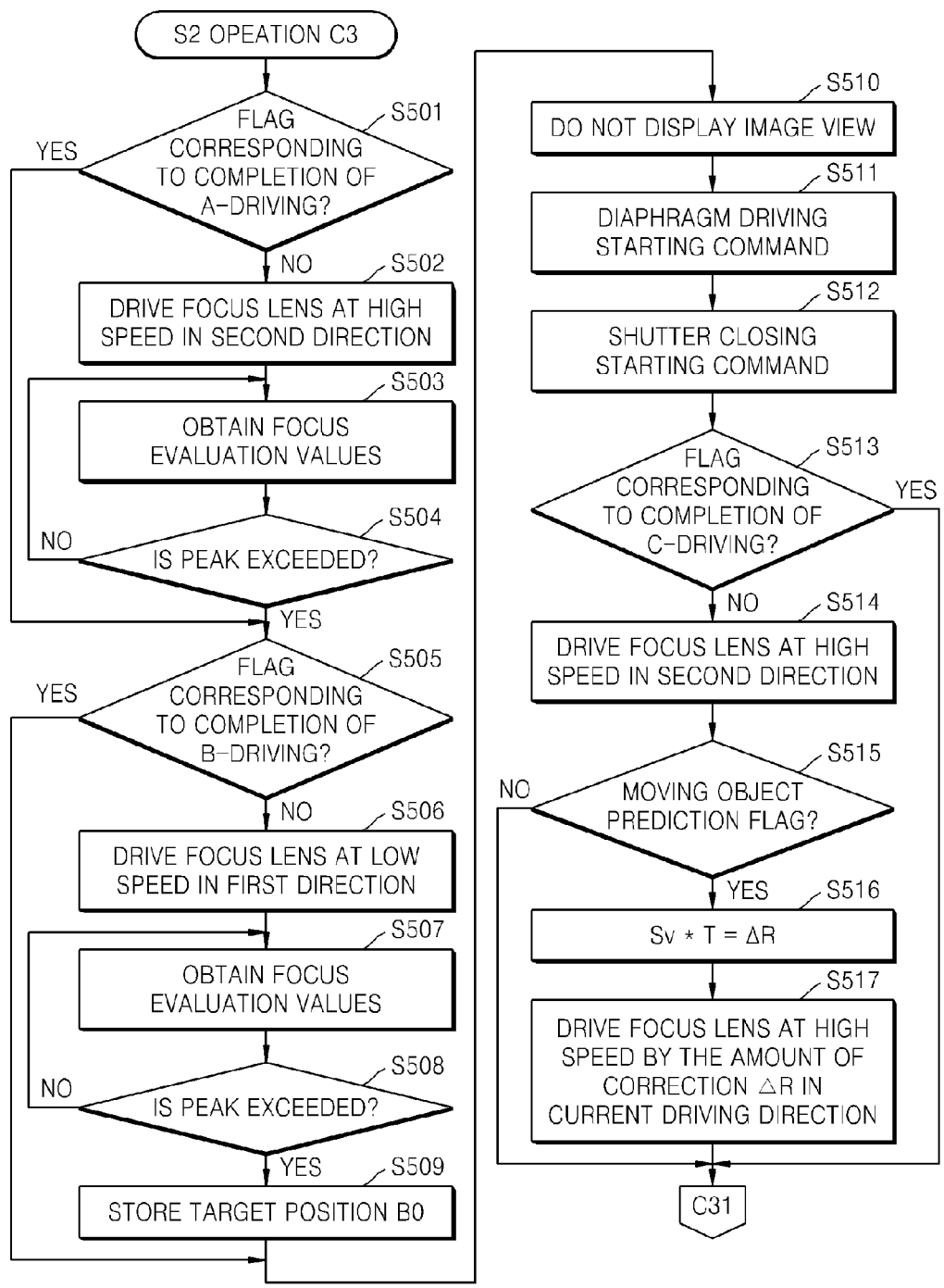
FIGS. 20 and 21 illustrate flowcharts of an S2 operation C3 when the switch S2 of the camera is turned on, according to another embodiment.
Figure 21:
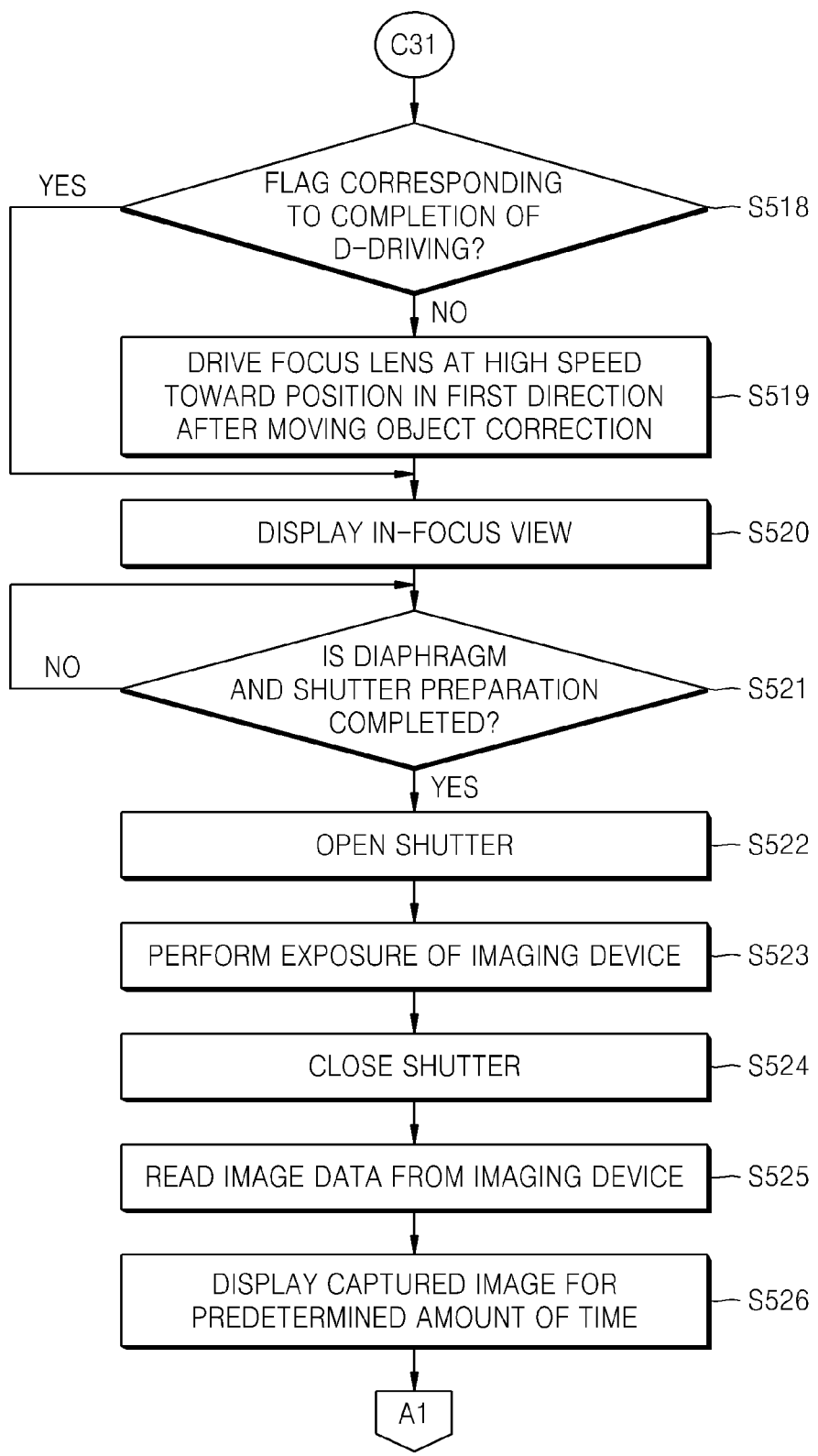

FIGS. 20 and 21 illustrate flowcharts of an S2 operation C3 when the switch S2 of the camera is turned on, according to another embodiment. In the current embodiment, operations of FIGS. 20 and 21 are basically the same as their corresponding ones of FIGS. 16 and 17, and thus, differences therebetween will be described as follows. In the current embodiment, C-driving and D-driving among moving object correction driving illustrated in FIG. 12 are driving during the release time lag.

First, referring to FIG. 20, from operations S501 to S509, A-driving and B-driving are performed according to a release time during an AF operation in the operation S1. This is the same as that of FIG. 16 and thus, a detailed description thereof is not provided. In operation S510, an image view is not displayed; in operation S511, diaphragm driving starts; and in operation S512, the shutter starts to be closed. In operation S513, a flag corresponding to completion of C-driving is checked. If the flag corresponding to completion of C-driving is set, it is determined that C-driving has been completed. Thus, the operation flow skips to operation S518. Otherwise, if C-driving has not been completed, C-driving is performed in operation S514. It is determined whether a moving object prediction flag is set, in operation S515. If the moving object prediction flag is set, in operation S516 the amount of correction of the moving object that corresponds to a release time lag T is obtained. The amount of correction of the moving object may be obtained by using the following Equation.

$$\Delta R = S_v * T \qquad \text{[Equation]}$$

In operation S517, the focus lens is driven at a high speed by the amount of correction $\Delta R$ in a current driving direction. Additional driving that corresponds to the amount of correction of the moving object is further performed in C-driving in operation S514. In operation S515, if the moving object prediction flag is not set, the operation flow skips to operation S518 in FIG. 21. Referring to FIG. 21, in operation S518, it is checked whether a flag corresponding to completion of D-driving is set. If D-driving has been completed, the operation flow skips to operation S520. Otherwise, if D-driving has not been completed, in operation S519, D-driving is performed. In detail, the focus lens is driven at a high speed to a target position BR after correction of the moving object is performed. The above operations correspond to C-driving and D-driving during the release time lag illustrated in FIG. 12. Operations 520 and thereafter are the same as their corresponding ones of FIG. 17 (S317 through S323) and thus, a detailed description thereof is not provided.

According to the embodiments, backlash driving is performed during an exposure preparation operation so that a shutter release time lag can be reduced. Thus, an image that is properly focused on a moving subject can be captured.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, DVDs, magnetic tapes, hard disks, floppy disks, and optical data storage devices. The computer readable recording media may also be distributed over network coupled computer systems so that the computer readable code is stored and executed in a distributed fashion. This media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. An auto-focusing apparatus comprising:
    a focus lens;
    a driving unit that drives the focus lens;
    an imaging device that receives an optical signal that has passed through the focus lens and generates an image signal;
    a focus evaluation value obtaining unit that obtains focus evaluation values related to a focusing state from the image signal;
    a target position obtaining unit that obtains a target position of the focus lens corresponding to a peak of the focus evaluation values;
    a compensation driving controller that controls backlash compensation driving of the focus lens when the focus lens is moved to the target position of the focus lens; and
    an exposure controller that performs imaging by using the imaging device after an exposure preparation control operation is performed,
    wherein the compensation driving controller controls backlash compensation driving of the focus lens while the exposure preparation operation is being performed, and
    wherein the exposure preparation control operation is at least one of: erasing a display of a captured image, closing a shutter, and adjusting a diaphragm.

2. The auto-focusing apparatus of claim 1, wherein the exposure controller performs the exposure preparation control operation after the target position of the focus lens corresponding to a peak of the focus evaluation values is obtained by the target position obtaining unit.

3. The auto-focusing apparatus of claim 1, wherein the compensation
    driving controller controls the focus lens to perform backlash compensation driving by driving the focus lens in the same direction as a direction toward the target position of the focus lens.

4. The auto-focusing apparatus of claim 1, wherein the compensation
    driving controller controls the focus lens to perform backlash compensation driving by driving the focus lens in a second direction different from a first direction toward the target position of the focus lens.

5. The auto-focusing apparatus of claim 1, wherein the compensation
driving controller controls the focus lens to perform backlash compensation driving by driving the focus lens in a first direction during the exposure preparation.

6. The auto-focusing apparatus of claim 1, wherein the compensation driving controller controls the focus lens to perform backlash compensation driving by driving the focus lens in a first direction and in a second direction during the exposure preparation.

7. The auto-focusing apparatus of claim 1, further comprising a moving object determining unit, wherein if it is determined that a difference between the focus evaluation values is greater than a reference value and a moving object has changed, the moving object determining unit determines that the image signal is generated by photographing the moving object.

8. The auto-focusing apparatus of claim 7, wherein the backlash
compensation driving comprises compensation driving of an amount of a focus deviation generated due to movement of the moving object when the moving object is photographed during the exposure preparation.

9. The auto-focusing apparatus of claim 8, wherein the amount of
a focus deviation generated due to movement of the moving object when the moving object is photographed during the exposure preparation corresponds to an amount of correction from a speed of the moving object and a release time lag time that is obtained before the exposure preparation starts, and wherein the backlash compensation driving comprises additional compensation driving of the focus lens by the amount of correction.

10. The auto-focusing apparatus of claim 1, wherein the backlash
compensation driving comprises compensation driving of an amount of a focus deviation generated due to movement of a moving object when the moving object is photographed during the exposure preparation.

11. The auto-focusing apparatus of claim 10, wherein the amount of
a focus deviation generated due to movement of the moving object when the moving object is photographed during the exposure preparation corresponds to an amount of correction from a speed of the moving object and a release time lag time that is obtained before the exposure preparation starts, and wherein the backlash compensation driving comprises additional compensation driving of the focus lens by the amount of correction.

12. An auto-focusing apparatus comprising:
a focus lens;
a driving unit that drives the focus lens;
an imaging device that receives an optical signal that has passed through the focus lens and generates an image signal;
a focus evaluation value obtaining unit that obtains focus evaluation values related to a focusing state from the image signal;
a target position obtaining unit that obtains a target position of the focus lens corresponding to a peak of the focus evaluation values;
a driving controller that finally drives the focus lens to the target position for an in-focus operation;
a compensation driving controller that controls backlash compensation driving of the focus lens when the focus lens is moved to the target position of the focus lens; and
an exposure controller that performs imaging by using the imaging device after an exposure preparation control operation is performed,
wherein:
the driving controller controls the focus lens to perform the final compensation driving during the exposure preparation,
the compensation driving controller controls backlash compensation driving of the focus lens while the exposure preparation operation is being performed, and
the exposure preparation control operation is at least one of: erasing a display of a captured image, closing a shutter, and adjusting a diaphragm.

13. The auto-focusing apparatus of claim 12, wherein the final
compensation driving of the focus lens to the target position comprises driving of the focus lens that does not obtain the focus evaluation values.

14. The auto-focusing apparatus of claim 12, wherein the final compensation driving of the focus lens to the target position is performed in the same direction as a driving direction of the focus lens that obtains the target position.

15. The auto-focusing apparatus of claim 12, further comprising a moving object determining unit, wherein if it is determined that a difference between the focus evaluation values is greater than a reference value and a moving object has changed, the moving object determining unit determines that the image signal is generated by photographing the moving object.

16. The auto-focusing apparatus of claim 12, wherein the final driving of the focus lens to the target position comprises compensation driving of an amount of a focus deviation generated due to movement of a moving object when the moving object is photographed during the exposure preparation.

17. The auto-focusing apparatus of claim 15, wherein the final driving of the focus lens to the target position comprises compensation driving of an amount of a focus deviation generated due to movement of the moving object when the moving object is photographed during the exposure preparation.

18. The auto-focusing apparatus of claim 16, wherein the amount of a focus deviation generated due to movement of the moving object when the moving object is photographed during the exposure preparation corresponds to an amount of correction from a speed of the moving object and a release time lag time that is obtained before the exposure preparation starts, and wherein compensation driving of the amount of the focus deviation is corrected when the focus lens is finally driven to the target position.

19. The auto-focusing apparatus of claim 17, wherein the amount of a focus deviation generated due to movement of the moving object when the moving object is photographed during the exposure preparation corresponds to an amount of correction from a speed of the moving object and a release time lag time that is obtained before the exposure preparation starts, and wherein compensation driving of the amount of the focus deviation is corrected when the focus lens is finally driven to the target position.

* * * * *